United States Patent
Yoshikuni et al.

(10) Patent No.: US 6,402,004 B1
(45) Date of Patent: Jun. 11, 2002

(54) CUTTING METHOD FOR PLATE GLASS MOTHER MATERIAL

(75) Inventors: Keisuke Yoshikuni, Akiruno; Shogo Tsukada, Hamura, both of (JP)

(73) Assignee: Hoya Corporation (JP)

(*) Notice: Subject to any disclaimer, the term of this patent is extended or adjusted under 35 U.S.C. 154(b) by 0 days.

(21) Appl. No.: 09/396,116

(22) Filed: Sep. 14, 1999

(30) Foreign Application Priority Data

Sep. 16, 1998 (JP) ............................................. 10-261347

(51) Int. Cl.$^7$ .............................. C03B 33/03; B26F 3/00
(52) U.S. Cl. .............................. 225/2; 225/94; 225/96.5; 225/104
(58) Field of Search ............................ 225/2, 94, 96.5, 225/104; 83/863, 880, 881, 886

(56) References Cited

U.S. PATENT DOCUMENTS

| | | | | |
|---|---|---|---|---|
| 3,584,773 A | * | 6/1971 | Grove et al. | 225/2 |
| 3,800,991 A | * | 4/1974 | Grove et al. | 225/2 |
| 3,865,673 A | * | 2/1975 | DeTorre | 225/96.5 X |
| 4,057,184 A | * | 11/1977 | Michalik | 225/2 |
| 4,109,841 A | * | 8/1978 | DeTorre | 225/96.5 |
| 4,140,820 A | * | 2/1979 | DeTorre | 427/292 |
| 4,487,350 A | * | 12/1984 | DeTorre | 225/2 |
| 4,524,894 A | * | 6/1985 | Leblond | 225/2 |
| 4,693,403 A | * | 9/1987 | Sprouse | 225/2 |
| 5,016,800 A | * | 5/1991 | Sato et al. | 225/2 |
| 5,120,343 A | * | 6/1992 | Monji et al. | 65/268 |
| 5,465,892 A | * | 11/1995 | Shinozaki et al. | 225/2 |
| 5,836,229 A | * | 11/1998 | Wakayama et al. | 83/886 |

* cited by examiner

*Primary Examiner*—Boyer Ashley
(74) *Attorney, Agent, or Firm*—Cook, Alex, McFarron, Manzo, Cummings & Mehler, Ltd.

(57) ABSTRACT

The present invention is directed to a method of cutting glass mother material involving preparing the plate glass mother material in which a plurality of grooves are scribed, disposing the plate glass mother material with the grooves turned inward; and pressing an outer surface of the plate glass mother material with a cushioning member having a thickness not to be protruded downward from a lowermost portion of an indenter, with the cushioning member being attached onto an under surface of an indenter base excluding the indenter, pressing a portion opposite to the groove on the outer surface with the indenter having a stretched shape, and cutting the plate glass mother material.

8 Claims, 11 Drawing Sheets

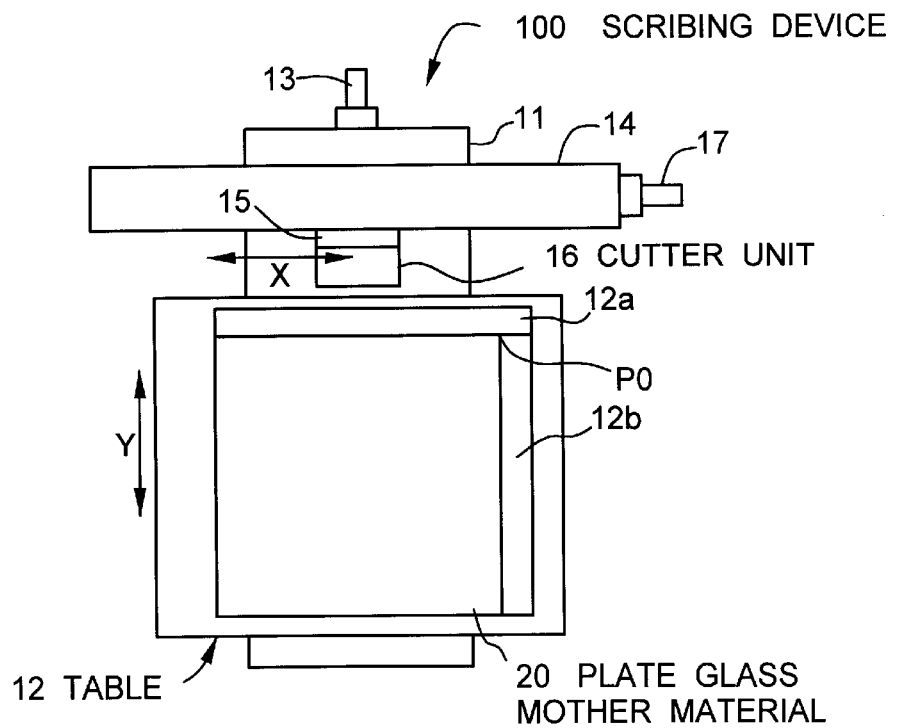
FIG. 7
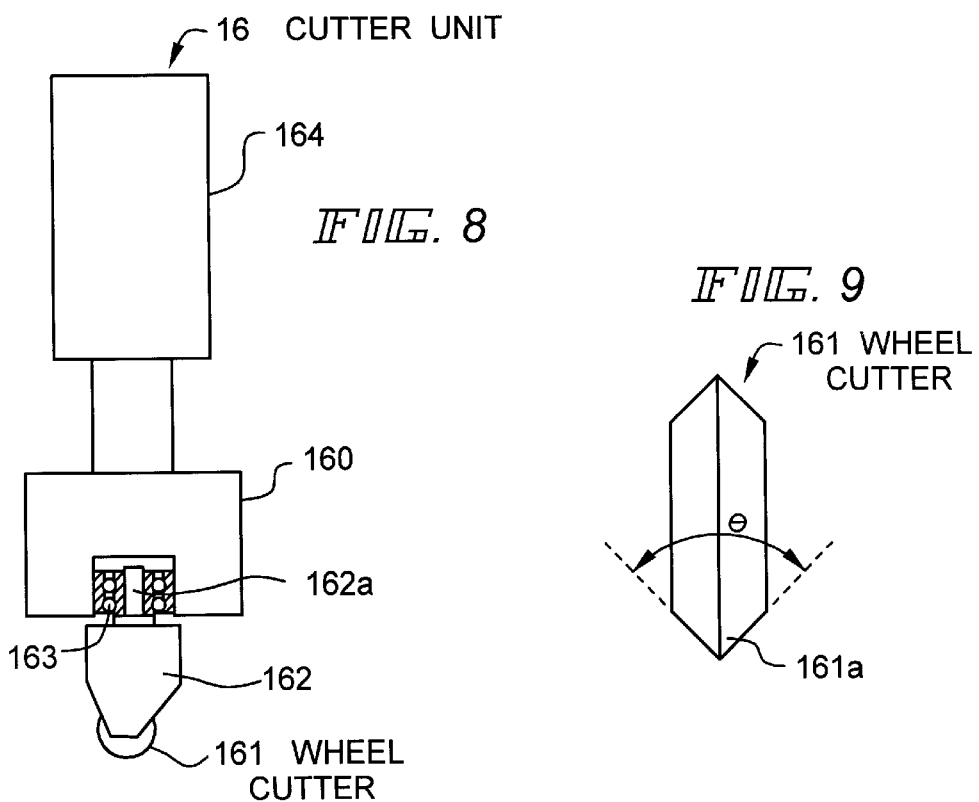
FIG. 8
FIG. 9

CUTTING METHOD FOR PLATE GLASS MOTHER MATERIAL

This application claims the Paris convention priority of Japanese patent application Hei 10-261347 filed on Sep. 16, 1998, the entire disclosure of which is incorporated herein by reference.

BACKGROUND OF THE INVENTION

1. Field of the Invention

The present invention relates to a method of cutting a plate glass member as a mother material of materials to be pressed for use on a reheat press method, and to a plate glass mother material cutting device, particularly to a method of cutting a plate glass mother material in which a plurality of grooves are scribed/processed beforehand on one main surface, and to a plate glass mother material cutting device.

2. Description of the Related Art

When optical elements such as an optical lens and a prism are formed, press molding is used. Examples of a press molding method mainly include a precision press molding method, a direct press method, and a reheat press method.

The precision press molding method is a molding method of transferring the shape and surface precision of a molding die to a softened glass, and the pressed material. requires no grinding or polishing.

On the other hand, the direct press method, and he reheat press method are molding methods based on the premise that after the press molding the grinding for bringing the shape of the pressed material close to a final product shape, and the polishing for polishing the surface of the pressed material are performed.

Since the precision press molding method is free of the polishing, it is suitable for manufacturing lenses having shapes difficult to polish, such as a non-spherical lens. However, in order to reproduce the shape precision of the molding die, pressing has to be performed when the viscosity during pressing is in a relatively high range of $10^8$ to $10^{12}$ dPa·S, and only the glass material satisfying the condition that it fails to be devitrified at the pressing viscosity can be used. Moreover, problems are that a manufacture device is large-scaled and expensive, and that manufacture cost is raised.

Therefore, in order to manufacture a large amount of glass products while the production cost is suppressed, the direct press method and the reheat press method are suitable.

The direct press method comprises injecting a predetermined amount of molten glass flowing out of a discharge pipe into lower and upper dies of the molding die, and performing pressing at a relatively low viscosity of around $10^3$ dPa·S. According to this method, the pressed material has a high weight precision, but the method is not suitable for the production of a small amount of a wide variety of products.

On the other hand, the reheat press method comprises preparing a material to be pressed having a predetermined weight, reheating the material to be pressed from a normal temperature, softening the material, and performing press molding by the molding die at the viscosity of around $10^5$ dPa·S. This method is not suitable for the production of a large amount of a small variety of products, but is suitable for the production of the small amount of the wide variety of products. In the reheat press method, when the weight of the material to be pressed is insufficient as compared with a cavity in the press molding die, the cavity of the molding die is insufficiently filled with the material to be pressed, which causes an elongation defect. Moreover, when the material to be pressed has an excessive weight, another problem occurs that the material overflows the molding die. Therefore, in the reheat press method, the weight adjustment of the material to be pressed is a big problem.

For example, glass materials to be pressed have been heretofore prepared by a method of using a cutting blade to cut the materials out of a plate-like glass mother material (hereinafter referred to as "the blade dicing method"). The blade dicing method lacks economical property because a part of the glass mother material is necessarily lost as a cutting margin. Moreover, since wear on a blade (cutting blade) is relatively excessive, the blade needs to be frequently replaced. Furthermore, since the blade is deflected during cutting, it is difficult to cut a large number of materials to be pressed having the same size out of one glass mother material, and weight dispersion among the obtained materials to be pressed relatively becomes large.

To solve the above-described problem in the blade dicing method, in recent years, the same applicant as that of the present application has proposed a method, which comprises: processing a plate-like glass mother material in a predetermined manner; applying a local compression to the glass mother material; and cutting the glass mother material by a generated tensile stress to obtain materials to be pressed having predetermined shapes (hereinafter referred to as "the local compression cutting method") (see the publication of Japanese Patent Application Laid-Open No. 189424/1998).

When the materials to be pressed are obtained by the local compression cutting method described in the publication, first the plate (flat) glass mother material is prepared in which one main surface is processed to enlarge the local compression (specifically, a groove is formed), and on the other main surface, a notch is formed opposite to the place processed to enlarge the local compression. Subsequently, the glass mother material is laid on a positioning member (corresponding to "the auxiliary cutting member" in the present specification) so that the main surface with the notch formed therein faces inward (downward). Under this state the local compression is applied to the place processed to enlarge the local compression, and the glass mother material is cut by tensile stresses generated on both sides of the notched portion when the local compression is applied, to obtain the materials to be pressed having desired shapes.

When the materials to be pressed are prepared by the local compression cutting method described in the Japanese Patent Application Laid-Open No. 189424/1998, the above-described problem in the blade dicing method can be eliminated or improved. When the glass mother material is obtained, however, the processing to enlarge the local compression has to be applied. Therefore, the number of manufacture processes to obtain the glass mother material is increased, and additionally a metal die (molding die) for applying the processing is required. As a result, manufacture cost is relatively raised.

Moreover in general, the materials to be pressed for use in the reheat press method are obtained by cutting the plate glass mother material, and as one cutting method, there is a method of using an ultra-hard wheel cutter to scribe the main surface of the plate glass mother material beforehand. FIG. 1 is a side sectional view showing a method of scribing the plate glass mother material. Moreover, FIG. 2 is a view as seen from the front side of the cutter of the scribing method. Furthermore, FIG. 3 is a view showing a concrete shape of a groove formed in the plate glass mother material. In this method, an ultra-hard wheel cutter 51 having a blade tip angle θ1 advances on a main surface 50a of a plate glass mother material 50 in an arrow direction of FIG. 10, to form a linear groove 52. When the groove 52 is formed, cracks are generated. The cracks include a vertical crack 53 vertical to the main surface 50a, and horizontal cracks 54, 55 substantially parallel with the main surface 50a. Moreover, a surface crack 56 is also generated as shown in FIG. 3.

After the groove 52 is formed, the plate glass mother material 50 is laid on a mounting base so that the main surface 50a with the vertical crack 53 formed therein faces downward, and a predetermined load is applied to a position opposite to the vertical crack 53 on the side of an opposite main surface 50b. Thereby, the vertical crack 53 grows, and tensile stresses F1 of the vertical crack 53 also help to cut the plate glass mother material 50.

Additionally, when the glass type and shape of the plate glass mother material differ, the way how the crack 53, and the like are generated differs. Therefore, even when the same ultra-hard wheel cutter is used to perform scribing with a quantitatively determined pressing force, desirable cracks cannot constantly be formed. Therefore, cut members cannot be obtained with good precision.

Moreover, there is another method of preparing materials to be pressed for use in the reheat press method, which comprises: scribing/processing a plurality of lattice grooves beforehand on one main surface of the plate glass mother material as the mother material of the materials to be pressed; laying the plate glass mother material with the grooves turned downward; pressing portions opposite to the grooves from above by a rod-like indenter; and allowing cracks to grow by stress concentration generated in the grooves to perform cutting.

In this cutting method, during pressing, a phenomenon takes place in which a cut piece rises centering on the groove. When the rising occurs, a problem arises that adjacent cut pieces strike each other and corners are chipped. When the corners are chipped, the materials to be pressed uniform in weight cannot be formed. Additionally, in worse cases, the cut pieces jump to the outside, and another problem is that the operation cannot advance to the next process.

SUMMARY OF THE INVENTION

An object of the present invention is to provide a method of manufacturing materials to be pressed in which local compression is utilized so that the materials to be pressed having high weight precision can easily be obtained at lower costs, a method in which the materials to be pressed resulting from the method are used to manufacture glass molded materials, and a local compression cutting device preferable for obtaining the materials to be pressed.

Another object of the present invention is to provide a method of manufacturing a grooved plate glass mother material from which accurate cut members can constantly be formed, a method of manufacturing glass materials, and a method of manufacturing glass optical elements.

Further object of the present invention is to provide a method of cutting a plate glass mother material in which cut pieces can be prevented from rising, and a plate glass mother material cutting device.

To attain the above-described objects, according to the present invention there is provided a method of manufacturing materials to be pressed, which comprises: disposing a plate glass mother material with a groove formed in one main surface on an auxiliary cutting member so that the main surface with the groove formed therein faces inward; subsequently applying a local compression to a site opposite to a site in which the groove is formed from the side of an outer main surface of the glass mother material; and cutting the glass mother material by tensile stresses generated in both sides of the groove when the local compression is applied. In the method, the shape follow-up property of the auxiliary cutting member is selected/determined so that when the groove is formed in only one main surface of the glass mother material, and the local compression is applied to the glass mother material, the glass mother material is cut by the tensile stresses under a state in which the periphery of the groove is in contact with the auxiliary cutting member.

Moreover, to attain the objects, according to the present invention there is provided a method of manufacturing glass molded materials, which comprises: heating/softening/treating the materials to be pressed obtained by the above-described method of manufacturing the materials to be pressed of the present invention; and subsequently performing press molding.

Furthermore, to attain the objects, according to the present invention, there is provided a local compression cutting device for carrying out the above-described method of manufacturing the materials to be pressed of the present invention, which comprises: a fixed board section having a base and an auxiliary cutting member disposed on a top surface of the base on which a material to be cut is laid; and local compression applying means for applying a local compression to the material to be cut laid on the auxiliary cutting member.

Moreover, to attain the objects, according to the present invention, there is provided a method of manufacturing a grooved plate glass mother material, which comprises: a process of pressing a cutter onto one main surface of the plate glass mother material to form a groove including at least a vertical crack, so that the plate glass mother material having the groove can be cut by local stress. In the process, the blade tip angle of the cutter is selected/determined in consideration of the thickness and material of the plate glass mother material so that the vertical crack becomes deeper than a horizontal crack.

In the method of forming the plate glass mother material, in consideration of the thickness and material of the plate glass mother material, the blade tip angle of the cutter is selected/determined so that the vertical crack becomes deeper than the horizontal crack.

Since the vertical crack is formed to become deeper than the horizontal crack, accurate cut members can constantly be formed.

Furthermore, to solve the problems, according to the present invention, there is provided a method of cutting a plate glass mother material in which a plurality of grooves are scribed/processed beforehand on one main surface, which comprises: laying the plate glass mother material with the grooves turned inward; pressing an outer surface of the plate glass mother material with a cushioning member, and pressing portions opposite to the grooves on the outer surface by a pressing indenter having a stretched shape; and cutting the plate glass mother material.

In the cutting method, the plate glass mother material is first disposed with the grooves turned inward. Subsequently, while the outer surface of the plate glass mother material is pressed with the cushioning member, the portions opposite to the grooves on the outer surface are pressurized with the pressing indenter having the stretched shape to cut the plate glass mother material. Thereby, after cutting, cut pieces are prevented from rising.

BRIEF DESCRIPTION OF THE DRAWINGS

FIG. 7 is a plan view diagrammatically showing the constitution of a scribing device.

FIG. 8 is a side view showing the constitution of a cutter unit.

FIG. 9 is a view showing the shape of a wheel cutter of the embodiment.

FIG. 10 show views of the shape example of the scribed plate glass mother material.

FIG. 23 show side views of the auxiliary cutting member.

DETAILED DESCRIPTION OF PREFERRED EMBODIMENTS

Figure 1:
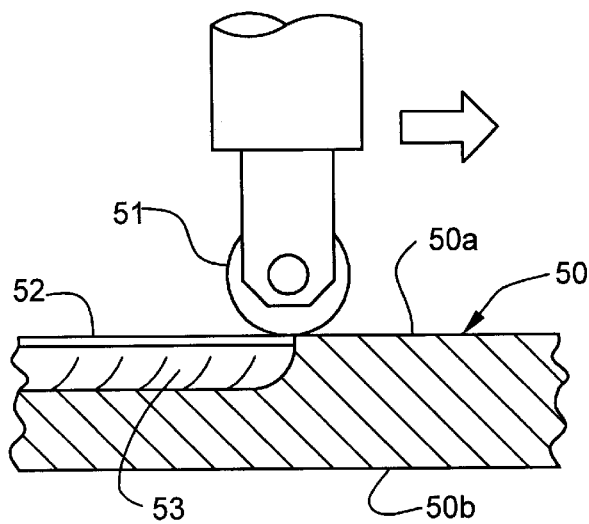
FIG. 1 is a side sectional view showing a method of scribing a plate glass mother material.

Embodiments of the present invention will be described hereinafter in detail with reference to the drawings.

First, a method of manufacturing materials to be pressed of the present invention will be described.

As described above, the present invention provides a method, which comprises: disposing a plate glass mother material with a groove formed on one main surface on an auxiliary cutting member so that the main surface with the groove formed therein faces inward; subsequently, applying local compression to a site opposite to a site in which the groove is formed from the side of an outer main surface of the glass mother material; and cutting the glass mother material by tensile stresses generated on both sides of the grooves when the local compression is applied to obtain a plurality of materials to be pressed. Therefore, the present invention has common respects with the local compression cutting method described in the publication of the Japanese Patent Application Laid-Open No. 189,424/1998. Additionally, the method of the present invention is included in the concept of the local compression cutting method.

However, in the method of the present invention, the groove (corresponding to "the notch" described in the publication) is formed in only one main surface of the plate glass mother material (hereinafter referred to as simply "the glass mother material"), and with respect to the other main surface not only the forming of the grooves but also "the processing to enlarge the local compression" described in the publication are not performed.

It is preferable to set the length of the groove to be equal to the length of the area to be cut as seen on a plane, but it is practically sufficient to obtain substantially 50% or more of the length of the area to be cut as seen on the plane. Moreover, it is preferable to set the linear width (meaning the linear width on one main surface with the groove formed therein, and meaning the same in the following) to be as narrow as possible so as to suppress the loss of the glass mother material with the forming of the groove. Furthermore, the depth is preferably set to be substantially in the range of 2 to 10% of the thickness of the glass mother material. Additionally, the sectional shape (meaning a sectional shape in a direction orthogonal to the longitudinal direction of the groove, and meaning the same in the following) is preferably linear, or V-shaped so that the shape on the side of the other main surface is narrower than that on the side of the main surface with the groove formed therein.

The groove can easily be formed using a tool (e.g., wheel cutter, oil cutter, diamond cutter, and the like) in which, for example, an ultra-hard material (ceramic, cermet, alloy) is used as a blade material.

The local compression applied for cutting the glass mother material with the groove formed in one main surface is preferably applied by an indenter (e.g., an indenter of a round bar shape) which has a linear pressing face. In this case, the length of the pressing face in the indenter is preferably set to be equal to or longer than the length of the area to be cut as seen on the plane in the glass mother material (hereinafter referred to as "the cut length").

The size of the local compression (size of a local compression load) applied to the glass mother material can appropriately be selected in accordance with (1) the material and thickness of the glass mother material to be cut, (2) the size of the glass mother material to be cut (meaning ½ of the length in the direction orthogonal to the longitudinal direction of the groove formed in the site opposite to the site to which the local compression is to be applied, and meaning the same in the following), (3) the cut length in the glass mother material to be cut, (4) the sectional shape and depth of the groove formed in the glass mother material to be cut, (5) the material of the auxiliary cutting member for use, and the like.

When the glass mother material to be cut is an optical glass mother material (meaning the glass mother material of the materials to be pressed for optical elements, and meaning the same in the following), and has a size of about 55 mm or less, the size of the local compression load is substantially in the range of 500 to 3000 kgf. The size of the local compression load is preferably set to be as small as possible, so that the materials to be pressed generated by cutting or the glass mother materials newly generated by the cutting are inhibited from interfering with (colliding) one another and being damaged by impact during the cutting.

After the glass mother material with the groove formed in one main surface is laid on the auxiliary cutting member having a predetermined Young's modulus, that is, the auxiliary cutting member whose Young's modulus is smaller than that of the glass mother material so that the main surface with the groove formed therein face inward (downward), the local compression is applied to the site of the glass mother material opposite to the site with the groove formed therein from the outer main surface in the glass mother material as described above. Then, bending moment is induced in the glass mother material and tensile stresses are generated on both sides of the groove (meaning both sides when the groove is seen along the longitudinal direction, and meaning the same in the following). Therefore, the glass mother material can be cut by the tensile stresses.

However, as described above, with respect to the materials to be pressed, it is desired to relatively strictly manage the weight. Therefore, when the materials to be pressed are obtained by the local compression cutting method, simply the cutting does not always suffice. When the materials to be pressed are obtained under a high weight precision, it is desired that the cutting should occur along the longitudinal cross section passing through the groove. To this end, it is preferred that when the local compression is applied to the glass mother material, no size relation be generated between the tensile stresses generated on both sides of the groove.

The size of the tensile stress depends on the size of the bending moment induced in the glass mother material when the local compression is applied to the glass mother material. Therefore, when the groove forming position is selected so that the size of the bending moment has the same value on both sides of the groove, that is, when the groove is formed in a position where the glass mother material can be divided into two equal parts, it seems that the glass mother material is cut along the longitudinal cross section passing through the groove.

However, according to the inventors' researches, in many cases, even when the groove is formed in the position where the glass mother material can be divided into two equal parts, the glass mother material cannot be cut along the longitudinal cross section passing through the groove. It has become clear that the tendency is particularly remarkable in the glass mother material (optical glass mother material) which is used as the material of the materials to be pressed to obtain optical elements.

As a result of intensive researches with respect to the reason why it is difficult to cut the optical glass mother material in desired positions, the present inventors et al. have arrived at the conclusion that the following phenomena (1) and (2) deeply participate:
  (1) Since as the material of the optical glass mother material, a plate material obtained usually by press molding is used as it is without being polished from the viewpoints such as (a) the glass loss during manufacture is suppressed, and (b) the increase of manufacture processes is suppressed, the optical glass mother material obtained by forming the groove in the plate material is usually curved slightly irregularly. Therefore, when the material is laid on the plane, rattling usually occurs.
  (2) Usually, micro cracks are present in the surface of the optical glass mother material.

Subsequently, the present inventors et al. have found that even to obtain the materials to be pressed from the optical glass mother material by the local compression cutting method, when the local compression is applied to the auxiliary cutting member having a specific shape follow-up property, that is, the optical glass mother material, the optical glass mother material is cut under a state where the periphery of the groove formed in the site opposite to the site to which the local compression is applied (since the groove is an index of the site to which the local compression is applied, it will hereinafter be referred to as "the groove used as the index" or "the groove to be used as the index") abuts on the auxiliary cutting member, and that by using the auxiliary cutting member with such shape follow-up property, desired materials to be pressed can be obtained under high weight precision.

Therefore, in the method of the present invention, the auxiliary cutting member having the shape follow-up property is used as the auxiliary cutting member.

It is preferred that the auxiliary cutting member and the periphery of the groove used as the index should contact each other over as a broad range as possible before the cutting occurs, but it is practically sufficient that the auxiliary cutting member abuts on the periphery of the groove used as the index in a width range of about 2.5 to 3 mm on each side of the groove used as the index. Moreover, the auxiliary cutting member and the periphery of the groove used as the index preferably abut on each other over the entire area in the longitudinal direction when the area to be cut is seen on the plane, but if they abut on each other over substantially 50% or more of the length in the longitudinal direction, this is practically sufficient. Additionally, the material of the auxiliary cutting member is selected from the materials which are smaller in Young's modulus than the glass mother material to be cut.

If the shape follow-up property of the auxiliary cutting member is too high, that is, if the auxiliary cutting member is too soft, it is difficult to generate the tensile stresses necessary for cutting the glass mother material on both sides of the groove used as the index when the local compression is applied to the glass mother material. Therefore, when the auxiliary cutting member having the above-described shape follow-up property is selected/determined, due consideration is also given with respect to whether or not the tensile stress necessary for cutting the glass mother material can be generated.

In general, when the material, thickness, size, and rattling degree of the glass mother material to be cut, and the cut length in the glass mother material are constant, the shape and size of the formed groove are the same, and Young's modulus of the auxiliary cutting member is higher (however, it should be lower than Young's modulus of the glass mother material), the tensile stress necessary for cutting the glass mother material can be generated by a small local compression. Therefore, when the auxiliary cutting member having the above-described shape follow-up property is selected/determined, the material, thickness, size and rattling degree of the glass mother material to be cut, the cut length in the glass mother material to be cut, and the like are taken into consideration.

For example, when the glass mother material to be cut is an optical glass mother material, the auxiliary cutting member can be selected/determined based on the following criteria I to III.

I. In the case where the rattling degree of the optical glass mother material exceeds 0.3 mm,
  (a) when (thickness [mm] of optical glass mother material)×(cut length [mm])≧340, there are materials with Young's modulus substantially in the range of 1.0 to 20.0 kg/mm$^2$, such as natural rubber, polyethylene resin, nitrile rubber, and isoprene rubber.
  (b) when (thickness [mm] of optical glass mother material)×(cut length [mm])<340, there are materials with Young's modulus substantially in the range of 240 to 350 kg/mm$^2$, such as acrylic resin, polyimide resin, polyamide resin, and acetal resin.

II. In the case where the rattling degree of the optical glass mother material exceeds 0 mm and is 0.3 mm or less,
  (a) when (thickness [mm] of optical glass mother material)×(cut length [mm])≧340, there are materials with Young's modulus substantially in the range of 35 to 70 kg/mm$^2$, such as urethane rubber, polypropylene, and fluoroplastic.
  (b) when (thickness [mm] of optical glass mother material)×(cut length [mm])<340, there are materials with Young's modulus substantially in the range of 240 to 350 kg/mm$^2$, such as acrylic resin, polyimide resin, polyamide resin, and acetal resin.

III. In the case where the rattling degree of the optical glass mother material is 0 mm, regardless of the thickness and cut length of the optical glass mother material, there are materials with Young's modulus substantially in the range of 240 to 350 kg/mm$^2$, such as acrylic resin, polyimide resin, polyamide resin, and acetal resin.

Actually, "the rattling degree" described herein means the maximum distance between the lower surface of the other end portion and the plane in the case where the glass mother material to be cut is laid on the plane so that the main surface with the groove formed therein in the glass mother material faces inward (downward) and one end portion is pressed (in the case where there are longitudinal and short directions in the glass mother material when the glass mother material is seen on the plane, the portion means one side end portion of the longitudinal direction).

In the method of the present invention, since the auxiliary cutting member having the shape follow-up property is used, by forming the groove only in one main surface in the glass mother material, without applying any particular processing to the other main surface in the glass mother material, therefore, without preparing any metal die for applying the processing, the glass mother material can be cut along the longitudinal cross section passing through the groove. As a result, the materials to be pressed with high weight precision can be obtained at low cost. Moreover, different from the blade dicing method, the blade (cutting blade) does not have to be frequently replaced, additionally the process of applying the particular processing is unnecessary, and, consequently, the materials to be pressed can easily be obtained.

Here, when the place where the groove is formed largely deviates from the position where the glass mother material can be divided into two equal parts, and the local compression is applied to the glass mother material using the groove as the index, the difference in size of the tensile stresses generated on both sides of the groove is enlarged, and it becomes difficult to cut the glass mother material along the longitudinal cross section passing through the groove. Therefore, when the groove is formed, the forming place is preferably selected so that when the local compression is applied to the glass mother material using the groove as the index, the size relation is inhibited from being generated between the tensile stresses generated on both sides of the groove, and the glass mother material is cut along the longitudinal cross section passing through the groove.

The place where the groove is formed usually lies in the site where the glass mother material can be divided into two equal parts as seen on the plane and the specific area in the vicinity of the site. The degree to which the area is extended differs in accordance with the material, thickness, size and rattling degree of the glass mother material to be cut, the cut length in the glass mother material, and the like. Additionally, by considering the groove forming place as described above, the glass mother material can more securely be cut along the longitudinal cross section passing through the groove. As a result, the materials to be pressed can be obtained under high weight precision.

To obtain a large number of materials to be pressed from one glass mother material, the glass mother material with a plurality of grooves formed therein needs to be successively cut. Additionally, in this case, to cut the glass mother material along the longitudinal cross section passing through the groove, the local compression applying site needs to be appropriately selected every time, so that the size relation is inhibited from being generated between the tensile stresses generated on both sides of the grooves when the local compression is applied to the glass mother material. Specifically, the groove needs to be appropriately selected as the index for the application of the local compression from the plurality of grooves every time the local compression is to be applied.

In this case, from the viewpoint of enhancement of productivity, the glass mother material is preferably cut along the entire longitudinal direction of the groove every time the cutting is performed, so that the target number of materials to be pressed can be obtained by applying the local compression by the same number of times as the number of the grooves formed in the glass mother material (however, it indicates the material not cut yet by the local compression). Additionally, to perform the above-described selection, from the viewpoint that the materials to be pressed having high weight precision be obtained, consideration is preferably given so that the cut length becomes shortest when the glass mother material newly generated by cutting (indicating the cut piece generated by cutting and comprising non-divided materials to be pressed) is further cut.

Figure 4:
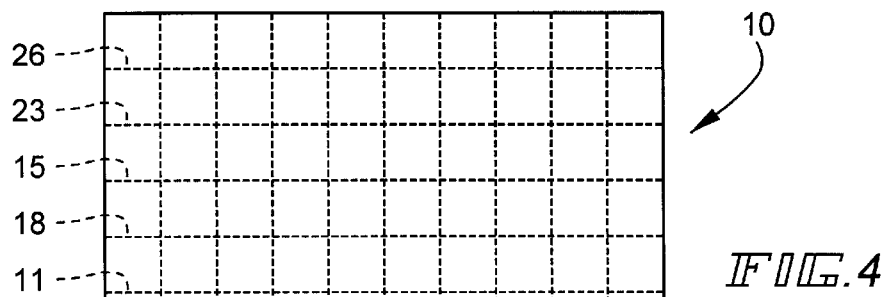
FIG. 4 is a plan view diagrammatically showing an example of the glass mother material for use to obtain 100 materials to be pressed in total.

For example, in the case where 100 materials to be pressed having substantially the same size are to be obtained from the glass mother material of 85×85×8 mm, as shown in FIG. 4, since 18 grooves 11 to 28 are formed in total in a lattice manner on one main surface in a glass mother material 10, the local compression is preferably applied in the following order, so that the frequency of application of the local compression is 18 times at minimum to obtain 100 materials to be pressed under the high weight precision.

Specifically, it is preferable that the local compression be successively applied using the grooves as the indexes in order of increasing the numeral attached to each of the 18 grooves shown in FIG. 4, that is, in order from the groove 11 to the groove 28. However, to apply the local compression in this order, during the second and subsequent local compression applications, the groove to be used as the index of the site to which the local compression is applied (e.g., the groove 22) is already separated. Therefore, while the entire shape of the cut glass mother material as seen on the plane is held to be substantially the same as the shape of the glass mother material 10 as seen on the plane before the cutting, that is, while the position of the groove before separated and the position of the groove after separated are held to be substantially unchanged, along the separated groove, the second and subsequent local compression applications are performed. Therefore, the second and subsequent local compression applications are performed on two or more glass mother materials once (indicating the cut pieces generated by cutting and comprising non-divided materials to be pressed).

As described above, in the case where a large number of materials to be pressed are obtained from one glass mother material, as the glass mother material is successively cut, a large number of glass mother materials (indicating the cut pieces generated by cutting and comprising the materials to be pressed) are newly generated. As the size of the glass mother material to be cut is reduced, the size of the local compression required for cutting the glass mother material is enlarged, and additionally the cut length in the glass mother material is shortened.

Therefore, depending on the size of the glass mother material and the size of the target material to be pressed in the stage where cutting by the local compression is not performed yet, to obtain a large number of materials to be pressed from one glass mother material, in the process a situation sometimes occurs in which the auxiliary cutting member formed of one type of material cannot satisfy the above-described shape follow-up property.

In the case where such situation is expected to occur, another auxiliary cutting member is preferably used, which comprises a plurality of types of members different in the shape follow-up property, which abuts on the periphery of the groove formed in the site opposite to the site with the local compression applied thereto when the local compression is applied to the glass mother material to be cut, and whose plurality of types of members are arranged in a predetermined state such that the glass mother material is cut in this state. The selection/determination of the members constituting the auxiliary cutting member is performed on the same criteria as those of the selection/determination of the above-described auxiliary cutting member comprising the single type of member.

Figure 5A:
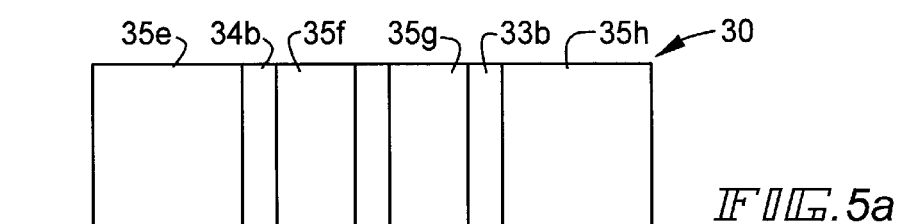
FIG. 5A is a plan view diagrammatically showing an example of an auxiliary cutting member for use to obtain the materials to be pressed from the glass mother material shown in FIG. 4.
Figure 5B:
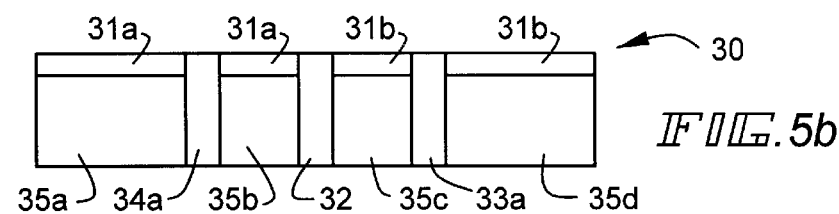
FIG. 5B is a side view diagrammatically showing the auxiliary cutting member shown in FIG. 5A.

An example of the auxiliary cutting member preferably for use when obtaining 100 materials to be pressed in total by applying the local compression to the glass mother material 10 shown in FIG. 4 in the above-described order 18 times is shown in FIGS. 5A and 5B. Additionally, the glass mother material 10 shown in FIG. 4 is to be used as the optical glass mother material with the rattling degree exceeding 0.3 mm (hereinafter referred to as "the optical glass mother material 10a").

For an auxiliary cutting member 30 shown in FIGS. 5A, 5B, the size as seen on the plane is equal to the size (85×85 mm) as seen on the plane of the optical glass mother material 10a, or slightly larger than the size in both longitudinal and transverse directions, and the auxiliary cutting member 30 is provided with seven natural rubber members 31a, 31b, 32, 33a, 33b, 34a, 34b, and eight acrylic resin members 35a to 35h.

Each of the natural rubber members 31a, 31b, 32, 33a, 33b, 34a, 34b are arranged in the area where the product of the thickness (=8 mm) and the cut length [mm] of the optical glass mother material to be cut (optical glass mother material 10a, or the optical glass mother material newly generated by cutting the optical glass mother material 10a) is 340 or more (see FIG. 5A). Specifically, the natural rubber members 31a, 31b are arranged, so that they coincide with the place where the groove 11 is formed in the optical glass mother material 10a as seen on the plane, between which the natural rubber member 32 is interposed. The natural rubber member 32 is disposed so that it coincides with the place where the groove 12 is formed in the optical glass mother material 10a as seen on the plane, and the natural rubber members 33a, 33b are arranged, so that they coincide with the place where the groove 13 is formed in the optical glass mother material 10a as seen on the plane, between which the natural rubber member 31b is interposed. Moreover, the natural rubber members 34a, 34b are arranged, so that they coincide with the place where the groove 14 is formed in the optical glass mother material 10a as seen on the plane, between which the natural rubber member 31a is interposed.

On the other hand, each of the acrylic resin members 35a to 35h is disposed between the corresponding natural rubber members 31a, 31b, 32, 33a, 33b, 34a, 34b in the area where the product of the thickness (=8 mm) and the cut length [mm] of the optical glass mother material to be cut (optical glass mother material newly generated by cutting the optical glass mother material 10a) is less than 340, so that the auxiliary cutting member 30 having the above-described size as seen on the plane can be obtained (see FIG. 5A). Additionally, the width of each of the natural rubber members 31a, 31b, 32, 33a, 33b, 34a, 34b in the short direction as seen on the plane is 5 mm.

Moreover, as shown in FIG. 5B, the top surface of each natural rubber member (in FIG. 5B only five members 31a, 31b, 32, 33a, 34a are seen) is protruded from the top surface of each acrylic resin member (in FIG. 5B only four members 35a to 35d are seen) by a predetermined length, and the top surfaces of these natural rubber members 31a, 31b, 32, 33a, 33b, 34a, 34b are substantially on one plane. Moreover, the top surfaces of the acrylic resin members 35a to 35h are substantially on one plane, and the thickness of the acrylic resin member is 15 mm.

Here, the protruded length of the top surface of the natural rubber member on the basis of the top surface of the acrylic resin member is selected/determined to satisfy the following conditions (A) and (B), but is substantially 0.5 mm or less when the glass mother material to be cut is the optical glass mother material.

(A) In the case where the local compression is applied to the area where the product of the thickness (=8 mm) and the cut length [mm] of the optical glass mother material to be cut (the optical glass mother material 10a, or the optical glass mother material newly generated by cutting the optical glass mother material 10a) exceeds 340, the optical glass mother material is cut with the periphery of the groove used as the index during the application of the local compression being in contact with the top surface of the natural rubber member, before the natural rubber member is deformed by the applied local compression to reach the same plane as that of the top surface of the acrylic resin member. Specifically, the above-described "case where the local compression is applied to the place where the product of the thickness (=8 mm) and the cut length [mm] of the optical glass mother material exceeds 340"

is the case where the local compression is applied using as the index the groove (corresponding to the groove 11, 12, 13 or 14 in FIG. 4, excluding the other grooves simply crossing) overlapping the natural rubber member as seen on the plane when the optical glass mother material 10a is disposed on the auxiliary cutting member 30 in a predetermined direction, out of the grooves formed in the optical glass mother material 10a.

(B) In the case where the local compression is applied to the places in which the product of the thickness (=8 mm) and the cut length [mm] of the optical glass mother material to be cut (the optical glass mother material newly generated by cutting the optical glass mother material 10a) is less than 340, the optical glass mother material is cut while out of the peripheries of the grooves formed in the places the areas other than the areas to be in contact with the natural rubber members are in contact with the top surfaces of the acrylic resin members. Specifically, the above-described "case where the local compression is applied to the places in which the product of the thickness (=8 mm) and the cut length [mm] of the optical glass mother material is less than 340" is the case where the local compression is applied using as the indexes the grooves 15 to 28 in FIG. 4 (however, these grooves are already separated by the previously applied local compression), out of the grooves formed in the optical glass mother material 10a.

Additionally, in the case where the above-described conditions (A) and (B) can be satisfied without protruding the top surface of the natural rubber member from the top surface of the acrylic resin member, these members may be arranged so that the top surfaces of the natural rubber member and the acrylic resin member are substantially positioned on one plane.

If the auxiliary cutting member formed of a plurality of types of members is used as described above, the appropriate member is disposed beforehand in the cutting position. This obviates the necessity of replacing the auxiliary cutting member in accordance with the cutting position, and enhances the efficiency of the cutting operation.

A method of manufacturing glass molded materials of the present invention will next be described.

As described above, the method of manufacturing the glass molded materials of the present invention comprises heating/softening/treating the materials to be pressed obtained by the above-described method of manufacturing the materials to be pressed according to the present invention, and subsequently performing press molding.

Here, the materials to be pressed may be manufactured from (cut out of) the glass mother material by the above-described method of manufacturing the materials to be pressed of the present invention, or may be subsequently subjected to barrel polishing or the like for weight adjustment to provide desired weights.

The heating/softening treatment of the material to be pressed is performed, for example, in the range of 700 to 900° C. in accordance with the material (composition) of the material to be pressed, so that the material to be pressed obtains a press moldable viscosity. Moreover, the press molding of the material to be pressed is performed using a molding die having a predetermined shape conforming to the shape of the target glass molded material, while the material to be pressed is heated/softened.

A local compression .cutting device of the present invention will next be described.

As described above. the local compression cutting device of the present invention is a device for carrying out the method of manufacturing the materials to be pressed of the present invention, and comprises a fixed board section having a base and an auxiliary cutting member disposed on a top surface of the base on which a material to be cut is laid; and local compression applying means for applying local compression to the material to be cut laid on the auxiliary cutting member.

Here, the auxiliary cutting member constituting the fixed board section is selected/determined with the same idea as that of the auxiliary cutting member for use in the above-described method of manufacturing the materials to be pressed of the present invention.

Moreover, used as the local compression applying means is the means by which the local compression can be applied to the predetermined place of the material to be cut by an indenter having a linear pressing face (e.g., a round bar indenter). The length of the area to which the local compression is applied by the indenter is selected to be equal to or longer than the cut length in the material to be cut. Additionally, the local compression applying means is controlled to stop at the time when the means moves toward the auxiliary cutting member from the top surface of the material to be cut by a predetermined amount after the local compression is applied to the material to be cut, and the stop position is selected/determined so that the impact generated when the material to be cut is cut can be minimized.

The local compression applying means preferably applies the local compression to the material to be cut along the face including a normal line with respect to the top surface of the base constituting the fixed board section from the viewpoint that the material to be cut is cut along the longitudinal cross section passing through the groove formed in the material to be cut.

When the local compression cutting device of the present invention having the above-described fixed board section and the local compression applying means is used, the materials to be pressed can be manufactured based on the above described method of manufacturing the materials to be pressed of the present invention, and the materials to be pressed having high weight precision can easily be obtained using the local compression at low cost. Moreover, the local compression cutting device of the present invention can be used to cut various brittle materials (glass, ceramic, and the like) into desired shapes.

Additionally, the material to be cut for use is formed of the brittle material which has a set of mutually opposite planes, and grooves are formed in one of the set of the planes. Moreover, the material to be cut is laid on the auxiliary cutting member so that the plane with the grooves formed therein turns inward (downward). Furthermore, the application of the local compression to the material to be cut by the local compression applying means is performed so that the local compression is applied to a site opposite to a site in which the groove is formed.

The local compression cutting device may be used for dividing one material to be cut simply into two to obtain two cut pieces, or may be used for successively cutting the material to be cut in which a plurality of grooves are formed to obtain a large number of cut pieces. Additionally, when the material to be cut with the plurality of grooves formed therein is successively cut to obtain a large number of cut pieces, at least one of the fixed board section and the local compression applying means is preferably set to be movable so that the mutual positions of the fixed board section and the local compression applying means as seen on the plane can relatively be changed.

When the fixed board section or the local compression applying means is movable as described above, even in the case where the material to be cut with the plurality of grooves formed therein is successively cut to obtain a large number of cut pieces (e.g., the materials to be pressed in the above-described method of the present invention), for example, by disposing local compression applying position selecting means and a positioning member as described later, after first laying the material to be cut in a predetermined position on the auxiliary cutting member, the target number of cut pieces can be obtained without positioning the material to be cut (including the cut pieces generated by cutting and comprising the non-divided materials to be pressed) again. Therefore, productivity can easily be enhanced.

For the local compression applying position selecting means desired to be disposed in the above-described case, when the local compression is applied to the material to be cut as described above, the local compression applying position is successively selected on the basis of a reference position so that the size relation is inhibited from being generated between the tensile stresses generated on both sides of the groove used as the index in the application of the local compression (the groove formed in the site opposite to the site to which the local compression is applied) and the material to be cut is cut.

The reference position may be a position which can be a reference when selecting the local compression applying site so that the material to be cut is cut as described above, the reference position may appropriately be set to arbitrary positions such as positions on the base, on the auxiliary cutting member, and on the material to be cut, and for example, the central point of the base as seen on the plane can be used as the reference position. When the central point is used as the reference position, the material to be cut is laid on the auxiliary cutting member so that the central axis (central axis parallel with a thickness direction) coincides with the central axis of the base. Additionally, in the case where by rotating the base, the positions of the fixed board section and the local compression applying means as seen on the plane are relatively changed, the central point is preferably positioned on the rotating shaft of the base.

The local compression applying position selecting means may successively select the local compression applying position as described above, and relatively and appropriately change the mutual positions of the fixed board section and the local compression applying means as seen on the plane in accordance with selection result. The relative changing of the mutual positions of the fixed board section and the local compression applying means as seen on the plane is performed, for example, by storing the local compression applying position and the order in accordance with the positions where the grooves are formed in the material to be cut beforehand in a memory, and successively changing the position of the fixed board section or the local compression applying means as seen on the plane by numerical control based on data.

Here, the entire shape of the material to be cut as seen on the plane during the second and subsequent local compression applications can be held to be substantially the same as the shape of the material to be cut as seen on the plane before cut, by also using the positioning member described later. Therefore, the local compression applying site can be selected so that the local compression is applied to two or more materials to be cut (indicating the cut pieces generated by cutting) once. For example, when 100 materials to be pressed are obtained from the glass mother material 10 shown in FIG. 4, the grooves 11 to 28 are separated with the cutting of the glass mother material 10. By also using the positioning member as described later, these grooves 11 to 28 are maintained substantially in a state before separation. Therefore, by using the groove maintained substantially in the state before separation as the index to apply the local compression, the local compression can also be applied to two or more materials to be cut (indicating the cut pieces generated by cutting) once.

On the other hand, the positioning member requested to be disposed in the case where the material to be cut with a plurality of grooves formed therein is successively cut to obtain a large number of cut pieces is disposed so as to surround the material to be cut (not cut yet) as seen on the plane. The positioning member positions the material to be cut so that the relative positions of the grooves in the cut materials to the reference position are not substantially changed. Therefore, the positioning member is disposed under a predetermined clamp force so that the entire shape of the cut material as seen on the plane can be held to be substantially the same as the shape of the material to be cut as seen on the plane, that is, the cut pieces formed by cutting the material to be cut are prevented from deviating from positions before cutting. The clamp force differs by the thickness of the material to be cut, and the like, but is usually about 5 kgf, for example, when the material to be cut is the optical glass mother material for the materials to be pressed.

The positioning member is constituted of a plurality of members for convenience when the material to be cut (not cut yet) is laid on the auxiliary cutting member, or when the cut pieces are recovered or collected, and is preferably disposed so that a part of the member can be moved in a desired direction.

Moreover, to apply the local compression to the material to be cut to cut the material to be cut, since a play for separating the cut pieces apart from one another centering on the cutting position needs to be secured between the positioning member and the material to be cut, the positioning member is preferably disposed so that the play can be secured. The play differs with the size of the material to be cut, and the like, and is usually in the range of about 0.2 to 1.5 mm when the material to be cut is the glass mother material for the materials to be pressed. However, in the case where the positioning member is prepared by a material rich in elasticity, or where elastic members, such as a spring, are used to dispose the positioning member so that it can move in a constant direction in a reversible manner, since the effect equal to the effect when the play is secured by deforming or moving the positioning member can be obtained, the play does not need to be secured.

When the above-described local compression applying position selecting means and positioning member are disposed, the local compression can successively be applied securely and continuously to the desired place in the material to be cut in which a plurality of grooves are formed. Therefore, for example, even to obtain 100 materials to be pressed from the glass mother material 10 shown in FIG. 4, without manually positioning the material to be cut (the cut pieces generated by cutting) halfway, by continuously applying the local compression in the above-described order 18 times, the target materials to be pressed can easily be obtained. Additionally, since the material to be cut can be cut along the longitudinal cross section passing through the groove used as the index during the application of the local compression, the materials to be pressed having high weight precision can be obtained.

However, as mentioned in the description of the method of manufacturing the materials to be pressed of the present invention, in the case where the material to be cut with a plurality of grooves formed therein is successively cut to obtain a large number of cut pieces, in the process a situation may occur in which the auxiliary cutting member formed of one type of material cannot satisfy the above-described shape follow-up property. Therefore, in the case where such situation is expected to occur, as mentioned in the description of the method of manufacturing the materials to be pressed of the present invention, for preferable use is the auxiliary cutting member which is constituted of a plurality of types of members different in the shape follow-up property, which constantly abuts on the periphery of the groove formed in the site opposite to the site with the local compression applied thereto when the local compression is applied to the material to be cut, and whose plurality of types of members are arranged in a predetermined state such that the material to be cut is cut in the state. When the auxiliary cutting member is used, the suitable auxiliary cutting member is disposed beforehand in the cutting position, and consequently, the auxiliary cutting member does not need to be replaced in accordance with the cutting position. As a result, the efficiency of the cutting operation can easily be enhanced.

Additionally, since by using the above-described positioning member, the cut pieces are prevented from being scattered by the impact during cutting, the cut pieces can easily be recovered or collected by the use of the positioning member. Therefore, the positioning member is preferably used not only in the case where a large number of cut pieces having predetermined shapes are obtained from one material to be cut, but also in the case where one or two cut pieces having predetermined shapes are obtained from one material to be cut.

EXAMPLE

Examples of the present invention will be described hereinafter with reference to the drawings, but the present invention is not limited to the following examples.

Example 1
(1) Preparation of Glass Mother Material

First, an optical glass plate of 85×85×8 mm (formed of FD8 (glass type name) manufactured by Hoya Corp.) was prepared. The optical glass plate has the size and weight corresponding to those of 100 materials to be pressed (each weight of 2.46 g) in which 0.05 g is included as a margin taken by barrel polishing.

Subsequently, a wheel cutter having a blade portion formed of an ultra-hard material and having a blade tip angle of 130° was used to form 18 grooves in total in one main surface of the optical glass plate, so that an optical glass mother material as a target was obtained. In this case, a load of 5 kgf was applied to the wheel cutter, and the grooves were formed in a lattice shape so that the materials to be pressed uniform in size can be obtained by 100 pieces in total from the optical glass mother material. The linear width of each groove is 1.2 mm, and the depth is 0.2 mm.

(2) Manufacture of Materials to be Pressed

Figure 6A:
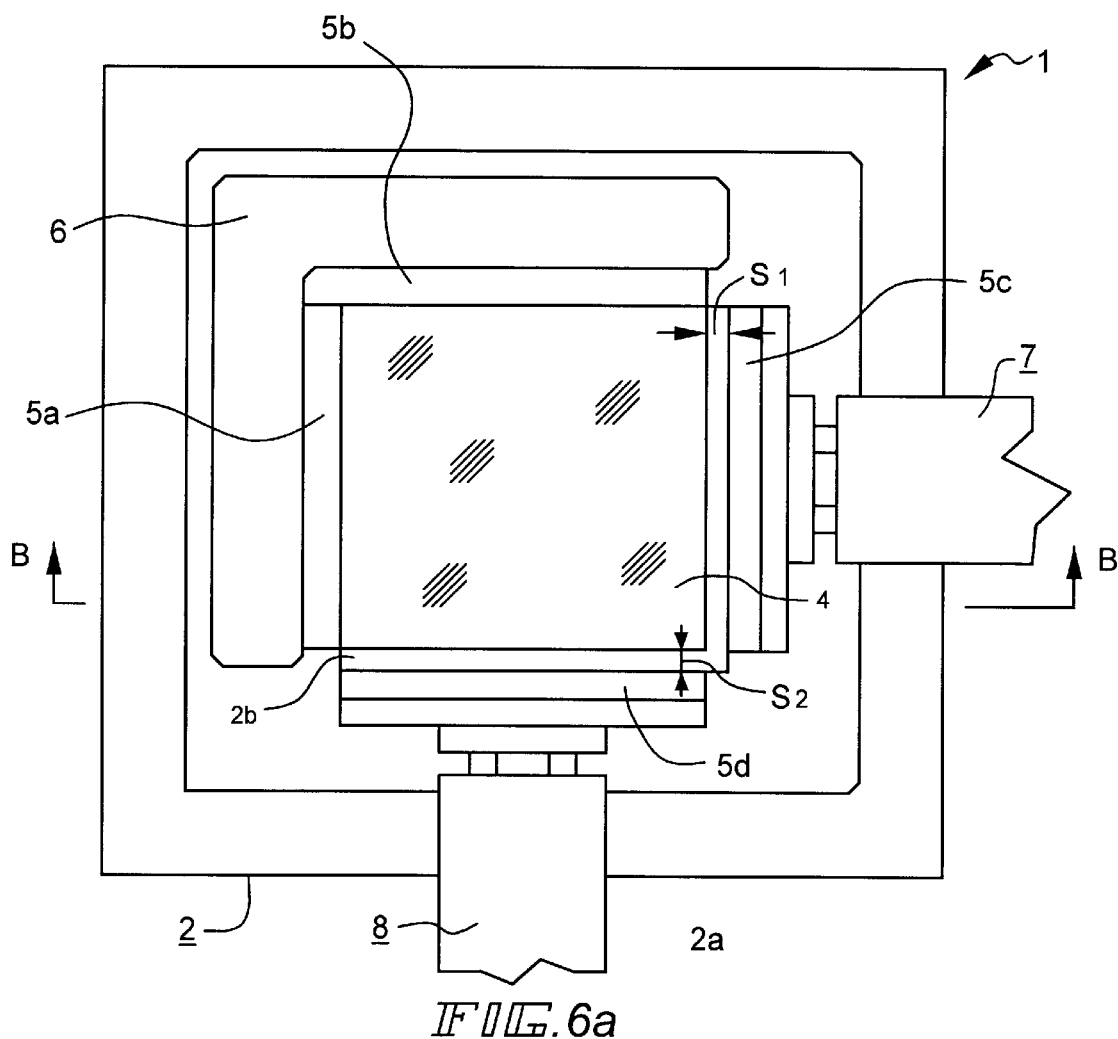
FIG. 6A is a plan view diagrammatically showing the vicinity of a fixed board section in a local compression cutting device for use in an embodiment.
Figure 6B:
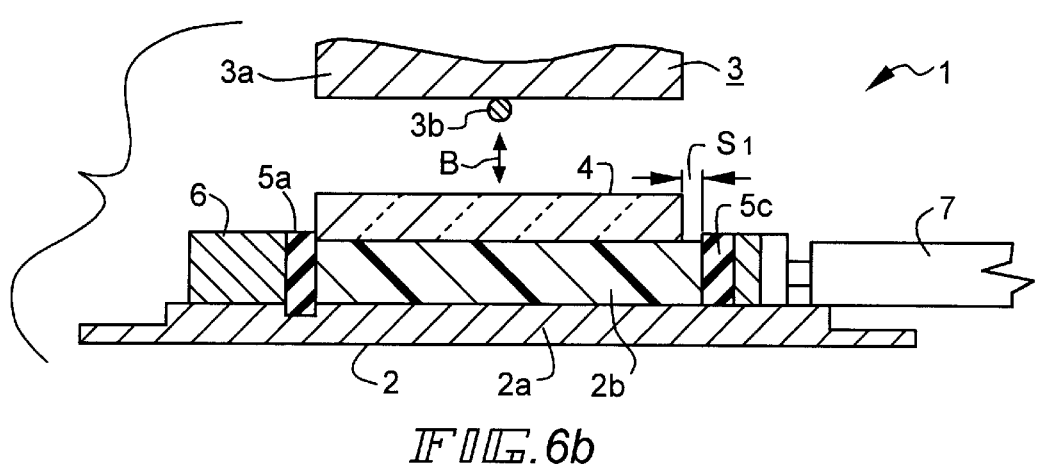
FIG. 6B is a sectional view taken along line B—B of FIG. 6A diagrammatically showing the fixed board section shown in FIG. 6A and local compression applying means omitted from FIG. 6A.

First, a local compression cutting device shown in FIGS. 6A and 6B was prepared.

As shown in FIGS. 6A, 6B, a local compression cutting device 1 is provided with a fixed board section 2 on which a material to be cut is laid, and local compression applying means 3 for applying local compression to a predetermined place of the material to be cut laid on the fixed board section 2.

The fixed board section 2 has a base 2a and an auxiliary cutting member 2b disposed on the top surface of the base 2a, and the size of the auxiliary cutting member 2b as seen on the plane is slightly larger than the size of a material to be cut 4 as seen on the plane. Then, the material to be cut 4 is laid on the auxiliary cutting member 2b. The fixed board section 2 is disposed so that it can rotate in the range of 90 degrees about a predetermined vertical axis by an operation mechanism (not shown), and that it can reciprocate in a predetermined horizontal direction.

On the other hand, the local compression applying means 3 has a moving table 3a and a round bar indenter 3b disposed transversely on an under surface of the moving table 3a, and as shown by an arrow B in FIG. 6B, the moving table 3a is disposed so that it can reciprocate in a vertical direction. Therefore, when the fixed board section 2 is horizontal, the local compression applying means 3 applies local compression to the material to be cut 4 along a face including a normal line to the top surface of the base 2a constituting the fixed board section 2. Additionally, the length of the pressing face of the round bar indenter 3b is set to be equal to or longer than the cut length in the material to be cut 4. Moreover, the downward movement of the moving table 3a in the vertical direction is controlled so that when the local compression is applied to the material to be cut 4, the pressing face of the round bar indenter 3b moves toward the auxiliary cutting member 2b from the top surface of the material to be cut 4 by a predetermined forcing amount (mm) and then stops. The forcing amount is preset in accordance with the position where the groove is formed.

In the embodiment, since the optical glass mother material obtained in the above (1) is used as the material to be cut 4, as the auxiliary cutting member 2b the auxiliary cutting member 30 shown in FIG. 5 is used. Moreover, the local compression cutting device 1 prepared in the embodiment further has a positioning member for positioning the material to be cut 4 to prevent the relative positions of the grooves formed in the material to be cut 4 to a reference position from being changed, and local compression applying position selecting means.

The reference position is the central point of the base 2a when the base 2a is seen on the plane, and the central point is on the top surface of the base 2a, and additionally on the rotating axis of the base 2a. Additionally, the material to be cut 4 is disposed on the auxiliary cutting member 2b (auxiliary cutting member 30) while the central axis (central axis parallel with a thickness direction) coincides with the rotating axis of the base 2a.

As shown in FIGS. 6A, 6B, the positioning member is constituted of four positioning members 5a to 5d formed of natural rubber. These positioning members are arranged so as to surround the material to be cut 4 (optical glass mother material) as seen on the plane during the use, and each of the positioning members 5a to 5d is formed of a plate material having a square shape when seen on the plane. Additionally, the positioning members 5a to 5d inhibit the cut pieces generated by cutting from moving by impact during cutting, and fulfill a function of holding the entire shape of the material to be cut after cutting as seen on the plane to be substantially the same as the shape of the material to be cut 4 before cutting as seen on the plane.

Two (members 5a, 5b) of the positioning members are fixed on two inner surfaces of an L-shaped reference plate 6 fixed/disposed on the base 2a, the positioning member 5c disposed opposite to the positioning member 5a is fixed to the tip end of an actuator 7 fixed on the base 2a, and the positioning member 5d disposed opposite to the positioning member 5b is fixed to the tip end of an actuator 8 fixed on the base 2a. The positioning member 5c is driven by the actuator 7 in a direction close to or apart from the positioning member 5a, and the positioning member 5d is driven by the actuator 8 in a direction close to or apart from the positioning member 5b.

The material to be cut 4 (optical glass mother material) is laid on the auxiliary cutting member 2b so that the main surface with the grooves formed therein turns inward (downward) and side surfaces abut on the positioning members 5a, 5b, and subsequently the positioning members 5c, 5d are driven by the actuators 7, 8 in the directions close to the positioning members 5a and 5b, respectively. In this case, as described above, since the size of the auxiliary cutting member 2b as seen on the plane is slightly larger than the size of the material to be cut 4 (optical glass mother material) as seen on the plane, the positioning member 5c is pressed against the side surface of the auxiliary cutting member 2b, not against the side surface of the material to be cut (optical glass mother material), and fixed under a clamp force of 4 kgf. Therefore, a play $S_1$ of a predetermined size (0.1 mm in the embodiment) is formed between the side surfaces of the positioning member 5c and the material to be cut 4 (optical glass mother material). Similarly, the positioning member 5d is pressed against the side surface of the auxiliary cutting member 2b, not against the side surface of the material to be cut (optical glass mother material), and fixed under the clamp force of 4 kgf. Therefore, a play $S_2$ of a predetermined size (0.1 mm in the embodiment) is formed between the side surfaces of the positioning member 5d and the material to be cut (optical glass mother material).

The local compression applying position selecting means is not shown in the drawings, but the local compression applying position selecting means has a memory in which the order of applying the local compression and the local compression applying position determined on the basis of the above-described reference position are stored, so that the local compression applying means 3 applies the local compression to the material to be cut 4 (optical glass mother material) laid on the fixed board section 2 in order of the numerals attached to the grooves 11 to 28 shown in FIG. 4. Additionally, the local compression applying position selecting means allows the fixed board section 2 to rotate or reciprocate by numerical control based on the data stored in the memory.

The optical glass mother material obtained in the above (1) was successively cut using the above-described local compression cutting device 1 to obtain 100 materials to be pressed in total. In this case, when the local compression was applied using the grooves 11 to 28 shown in FIG. 4 as the indexes, the size of the local compression load and the forcing amount were set to values shown in Table 1.

TABLE 1

| Groove No. | Forcing Amount (mm) | Local Compression Load (kgf) |
| --- | --- | --- |
| 11 | 0.3 | 500 |
| 12 | 0.3 | 500 |
| 13 | 0.6 | 800 |
| 14 | 0.6 | 800 |
| 15 | 0.6 | 800 |
| 16 | 0.6 | 800 |
| 17 | 1.2 | 2000 |
| 18 | 1.2 | 2000 |
| 19 | 1.2 | 2000 |
| 20 | 1.2 | 2000 |
| 21 | 1.1 | 1500 |
| 22 | 1.1 | 1500 |
| 23 | 1.1 | 1500 |
| 24 | 1.1 | 1500 |

TABLE 1-continued

| Groove No. | Forcing Amount (mm) | Local Compression Load (kgf) |
| --- | --- | --- |
| 25 | 1.2 | 2000 |
| 26 | 1.2 | 2000 |
| 27 | 1.2 | 2000 |
| 28 | 1.2 | 2000 |

Additionally, from when the optical glass mother materials was laid on the auxiliary cutting member 2b until 100 materials to be pressed in total were obtained, the removing of the cut pieces generated by cutting, the positioning of the cut pieces, and the like were not necessary at all.

For the materials to be pressed obtained in this manner, measured weight ranges and dispersions of measured weights to theoretical weights were obtained. Results are shown with the theoretical weights in Table 2.

Example 2

The optical glass mother material having a rattling degree of 0.35 mm was obtained in the same procedure as in Example 1 (1) except that as the material of the optical glass mother material, an optical glass plate of 85×85×8 mm (formed of BSC7 (glass type name) manufactured by Hoya Corp.), and 100 materials to be pressed in total were obtained from the optical glass mother material in the same procedure as in Example 1 (2).

For the materials to be pressed obtained in this manner, the measured weight ranges and dispersions of measured weights to theoretical weights were obtained. Results are shown with the theoretical weights in Table 2.

Example 3

The optical glass mother material having a rattling degree of 0.35 mm was obtained in the same procedure as in Example 1 (1) except that as the material of the optical glass mother material, an optical glass plate of 85×85×8 mm (formed of NBFD11 (glass type name) manufactured by Hoya Corp.), and 100 materials to be pressed in total were obtained from the optical glass mother material in the same procedure as in Example 1 (2).

For the materials to be pressed obtained in this manner, the measured weight ranges and dispersions of measured weights to theoretical weights were obtained. Results are shown with the theoretical weights in Table 2.

TABLE 2

| | Measured Weight Range (g) | Measured Weight Dispersion (%) | Theoretical Weight (g) |
| --- | --- | --- | --- |
| Example 1 | 2.38 to 2.54 | about ±3 | 2.46 |
| Example 2 | 1.41 to 1.50 | about ±3 | 1.46 |
| Example 3 | 2.51 to 2.66 | about ±3 | 2.59 |

As shown in Table 2, each of the materials to be pressed obtained in Examples 1 to 3 had a small dispersion of the measured weights to the theoretical weight, that is, a high weight precision.

Example 4

The materials to be pressed obtained in either one of the Examples 1 to 3 and a molding die having a cavity of a predetermined shape were used to manufacture biconvex lenses by press molding. In this case, the press molding was performed after performing the heating/softening treatment by heating the material to be pressed disposed in the cavity of the molding die together with the molding die.

First, the material to be pressed formed in the example was subjected to barrel grinding, the corner of the material to be pressed was cut, the surface was roughed, and a mold release agent such as boron nitride was uniformly applied to the surface of the material to be pressed.

The barrel polished material to be pressed was heated from a normal temperature, and the heated/softened material to be pressed was laid on a lower die of the press molding die via delivery means. Subsequently, when the viscosity of the heated/softened material to be pressed was in the range of $10^4$ to $10^6$ dPa·S, preferably $10^5$ dPa·S, collective press molding was performed with a plurality of molding dies having molding faces to provide final lens shapes. The molding die is constituted of upper and lower dies, and may include a barrel die. The press molding was performed under atmospheric environment.

When $B_2O_3$—$La_2O_3$ glass type was used in the material to be pressed, the material to be pressed, in a heated/softened state to about 780° C. ($10^5$ dPa·S), was introduced to the lower-die molding face heated to about 660° C. by the delivery means. Subsequently, the lower die was pressed onto the upper die heated to about 670° C., and the softened material to be pressed was press molded under 30 kg/cm² for two or three seconds.

Moreover, when $SiO_2$—$B_2O_3$ glass type was used in the material to be pressed, the material to be pressed, in a heated/softened state to about 870° C. ($10^5$ dPa·S), was introduced to the lower-die molding face heated to about 650° C. by the delivery means. Subsequently, the lower die was pressed onto the upper die heated to about 660° C., and the softened material to be pressed was press molded under 30 kg/cm² for two or three seconds.

Additionally, reheat pressing was performed on the above-described two glass types by changing the viscosity during pressing, and press molding conditions are shown in Table 3.

Since the material to be pressed had a small weight dispersion, during the reheat pressing, the elongation defect of the material to be pressed or the protruding of the material to be pressed from the molding die were not recognized.

The pressed material prepared by the reheat pressing was subjected to coarse grinding, precise grinding, and polishing, so that a final product was obtained.

TABLE 3

| Example Condition | $B_2O_3$—$La_2O_3$ type | | | $SiO_2$—$B_2O_3$ type | | |
|---|---|---|---|---|---|---|
| | 1 | 2 | 3 | 4 | 5 | 6 |
| Viscosity during pressing (dPa · S) | $10^4$ | $10^5$ | $10^6$ | $10^4$ | $10^5$ | $10^6$ |
| Temperature during pressing (° C.) | 830 | 780 | 750 | 950 | 870 | 790 |
| Upper-die temperature (° C.) | 650 | 670 | 675 | 640 | 660 | 665 |
| Lower-die temperature (° C.) | 640 | 660 | 665 | 630 | 650 | 655 |
| Press pressure (kg/cm²) | 25 | 30 | 35 | 25 | 30 | 35 |
| Press time (seconds) | 4 | 2 to 3 | 2 | 4 | 2 to 3 | 2 |

As a result, also when the material to be pressed obtained in either one of Examples 1 to 3 was used, the elongation defect of the material to be pressed and the protruding of the material to be pressed from the molding were not recognized, so that a good-quality biconvex lens could be obtained.

A scribing device for use in the present invention will next be described.

FIG. 7 is a plan view diagrammatically showing the constitution of the scribing device. On a base 11 of a scribing device 100 for use in the embodiment, a table 12 is slidably attached in a Y-axis direction. The table 12 is moved/controlled by a Y-axis drive motor 13. On the table 12 acrylic plates 12a, 12b are fixed for approach run of a cutter. Moreover, a plate glass mother material 20 is laid so as to closely abut on inner side surfaces of the acrylic plates 12a, 12b. The plate glass mother material 20 is an optical glass mother material, particularly a glass mother material as the material of the materials to be pressed for optical elements as described later. One corner portion P0 of the plate glass mother material 20 is set in a scribing origin.

Moreover, a cutter mechanism 14 is disposed on the base 11. In the cutter mechanism 14, a vertical movement mechanism 15 and a cutter unit 16 are integrally attached slidably in X-axis direction. As described later, the cutter unit 16 scribes the plate glass mother material 20 by its wheel cutter, and vertically moves by operation of the vertical movement mechanism 15. The vertical movement mechanism 15 and the cutter unit 16 are moved/controlled by an X-axis drive motor 17.

The X-axis drive motor 17 and Y-axis drive motor 13 are driven/controlled by a controller (not shown).

FIG. 8 is a side view showing the constitution of the cutter unit 16. To a fixing member 160 connected to the vertical movement mechanism 15, a wheel cutter 161 is attached via a holder 162. For the holder 162, its shaft 162a is attached to the fixing member 160 via a bearing 163. Thereby, the wheel cutter 161 can rotate about an axis of vertical direction in which a blade is directed.

Moreover, the cutter unit 16 is provided with a pressing cylinder 164. The pressing cylinder 164 adjusts the pressing load of the wheel cutter 161 when the plate glass mother material 20 is scribed. The pressing load is appropriately regulated in accordance with various conditions as described later.

FIG. 9 is a view showing the shape of the wheel cutter 161 of the embodiment. Here, the state is shown as seen from a direction at right angles to the rotating shaft of the wheel cutter 161. The wheel cutter 161 is an ultra-hard wheel cutter, and both faces of a blade tip 161a are symmetrical. Angle θ of the blade tip 161a is appropriately selected in accordance with various conditions as described later.

In the scribing device 100 of the embodiment constituted as described above, by drive of the X-axis drive motor 17 and the Y-axis drive motor 13 shown in FIG. 7, the cutter unit 16 is positioned to the plate glass mother material 20, and by the vertical movement mechanism 15, the cutting amount of the wheel cutter 161 to the plate glass mother material 20 is controlled. Additionally, by rotating the wheel cutter 161, and relatively moving the table 12 and the cutter unit 16, the surface of the plate glass mother material 20 is scribed.

Figure 2:
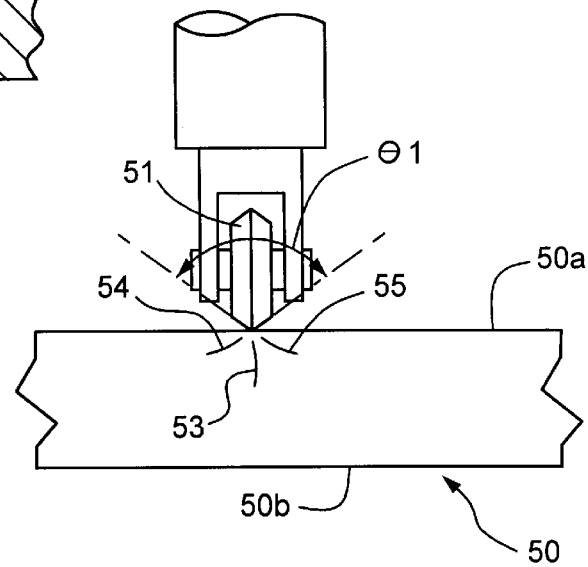
FIG. 2 is a view of the cutter of the scribing method as seen from a front side.
Figure 3:
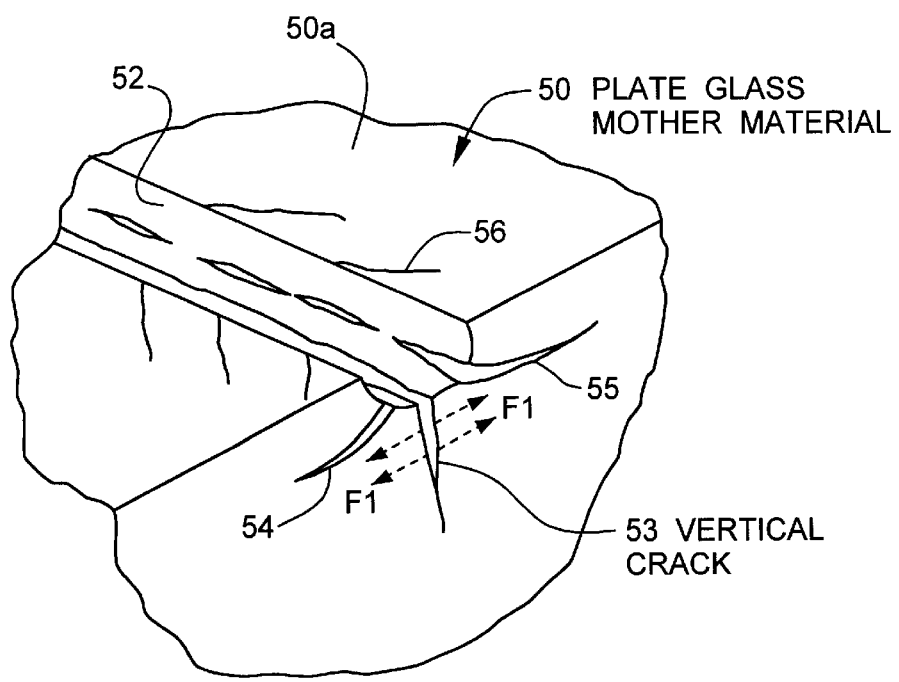
FIG. 3 is a view showing the concrete shape of a groove formed in the plate glass mother material.
Figure 10A:
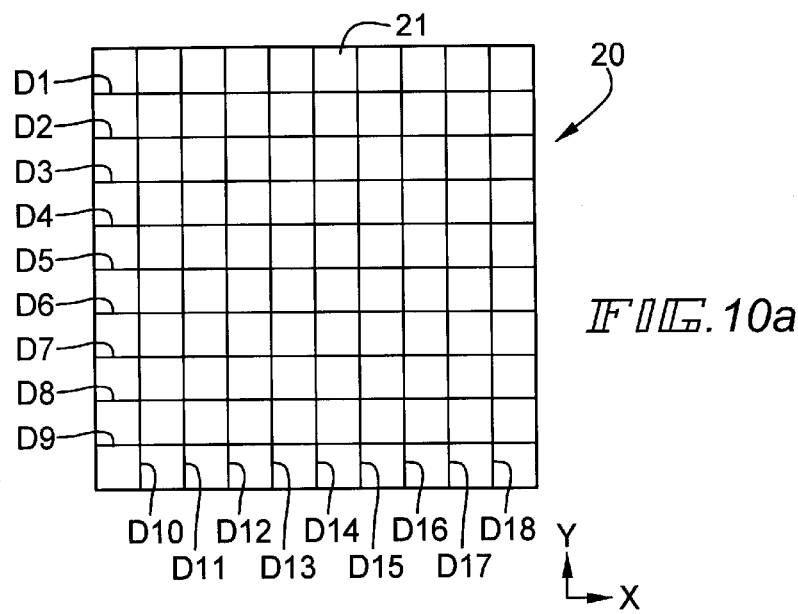
FIG. 10A is a plan view.
Figure 10B:
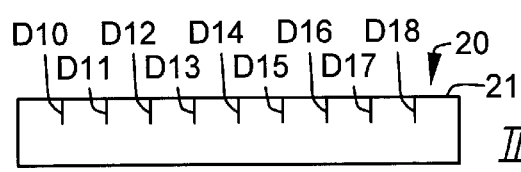
FIG. 10B is a side view.

FIG. 10 show views of the shape example of the scribed plate glass mother material 20, FIG. 10A is a plan view, and FIG. 10B is a side view. Here, an example is shown in which out of two main surfaces 21, 22 of the plate glass mother material 20, 18 grooves D1 to D18 are formed in the upper main surface 21. The grooves D1 to D18 are formed in a lattice form at equal intervals. Moreover, the grooves D1 to D18 are formed so that substantially vertical cracks are generated in the main surface as shown in FIGS. 2 and 3.

The plate glass mother material 20 with the grooves formed therein is cut by a plate glass material cutting device.

Figure 11:
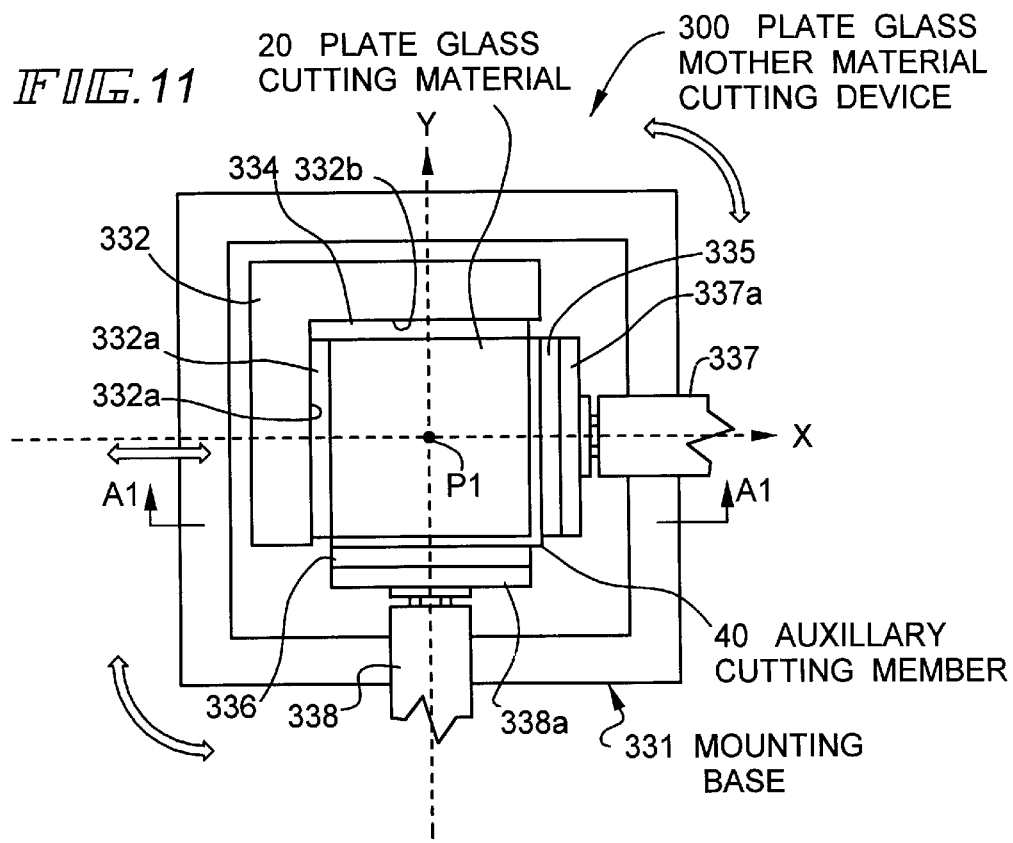
FIG. 11 is a plan view showing the constitution in the vicinity of the mounting base of the plate glass mother material cutting device.
Figure 12:
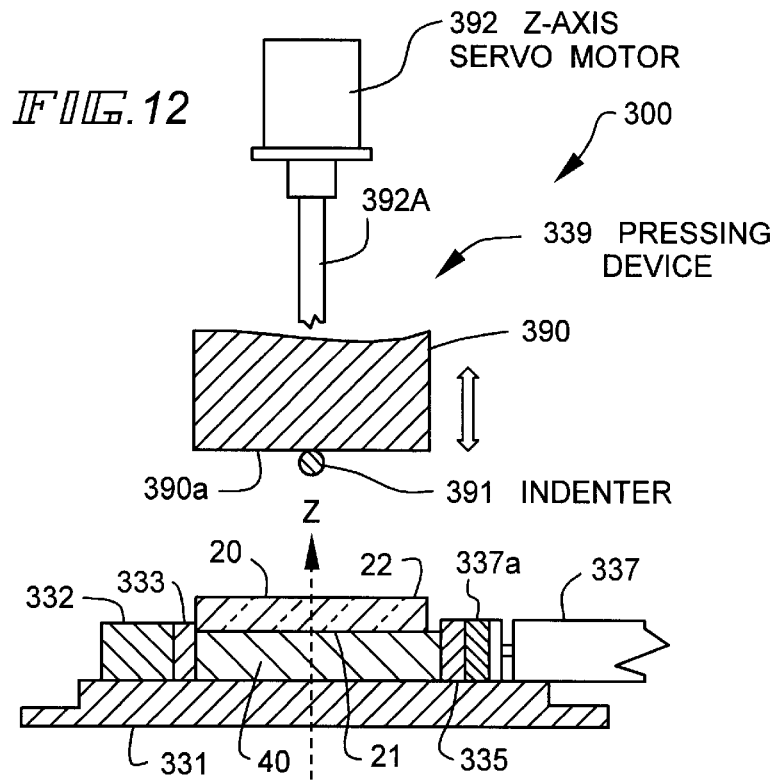
FIG. 12 is a sectional view taken along line A1—A1 of FIG. 11.

FIG. 11 is a plan view showing the constitution in the vicinity of the mounting base of the plate glass mother material cutting device. Moreover, FIG. 12 is a sectional view taken along line A1—A1 of FIG. 11. A plate glass mother material cutting device 300 is provided with a mounting base 331 on which the plate glass mother material 20 is laid. The mounting base 331 is disposed so that it can reciprocate in the X-axis direction of FIG. 11. Moreover, when the operation is started, the mounting base 331 is disposed so that a central point P1 coincides with the origin of X-Y coordinate system. Furthermore, the mounting base 331 is disposed so that it can rotate about the axis of the central point P1 in X-Y plane. The movement and rotation of the mounting base 331 are executed by a drive mechanism section (not shown) provided on the underside of the mounting base 331.

A reference plate 332 is fixed onto the mounting base 331. The reference plate 332 is an L-shaped member, and positioning members 333, 334 are fixed to inner side surfaces 332a, 332b. The positioning members 333, 334 are formed of elastic materials such as natural rubber, so that chipping, and the like are prevented from occurring when the plate glass mother material 20 is cut.

Moreover, an auxiliary cutting member 40 having a substantially square plate shape is laid on the mounting base 331. The auxiliary cutting member 40 is pressed against the positioning members 333, 334 of the reference plate 332 by pressing devices 337 and 338. A positioning member 335 formed of natural rubber is fixed to a pressing plate 337a of the pressing device 337. The pressing device 337 presses the auxiliary cutting member 40 via the positioning member 335 in the X-axis direction toward the positioning member 333 of the reference plate 332.

Similarly, a positioning member 336 formed of natural rubber is fixed to a pressing plate 338a of the pressing device 338. The pressing device 338 pushes the auxiliary cutting member 40 via the positioning member 336 in the Y-axis direction onto the positioning member 334 of the reference plate 332. In this manner, the auxiliary cutting member 40 is positioned/fixed onto the mounting base 331.

The plate glass mother material 20 slightly smaller than the auxiliary cutting member 40 is laid on the auxiliary cutting member 40. The plate glass mother material 20 is laid so that the main surface 21 with the grooves D1 to D18 formed therein is directed downward and closely abuts on the side of the positioning members 333, 334. In this case, as shown in FIG. 12, the plate glass mother material 20 is protruded from the upper side surfaces of the positioning members 333 to 336 by a predetermined length from the upper main surface 22. Moreover, since the plate glass mother material 20 is smaller than the auxiliary cutting member 40, an appropriate gap (e.g., 0.1 mm here) is formed between the plate glass mother material 20 and the positioning member 335, 336. The gap secures an escape space of glass during cutting.

In the mounting base 331, member dimensions are designed so that when the plate glass mother material 20 is laid, the center of the plate glass mother material 20 coincides with the central point P1 of the mounting base 331.

As shown in FIG. 12, a pressing device 339 is disposed above the mounting base 331. An indenter base 390 of the pressing device 339 is connected to the shaft of a Z-axis servo motor 392 via a ball screw 392a. The indenter base 390 vertically moves along Z-axis by rotation of the Z-axis servo motor 392. A round bar indenter 391 extending in the Y-axis direction is fixed to an under surface 390a of the indenter base 390. The indenter 391 presses from above and cuts the plate glass mother material 20 as described later, and has substantially the same length as that of the groove of the plate glass mother material 20.

In the plate glass mother material cutting device 300 constituted as described above, when the cutting operation is started, the central point P1 of the mounting base 331 is positioned in the origin of X-Y coordinate. On the other hand, the pressing device 339 is in a position sufficiently higher than the mounting base 331 as shown in FIG. 12. In this case, the position and direction of the mounting base 331 are controlled so that the groove to be first cut (e.g., the groove D5) of the plate glass mother material 20 extends along the Y-axis, that is, the groove is directed to overlap the indenter 391 of the pressing device 339 on the X-Y plane.

When positioning is completed, the Z-axis servo motor 392 operates to lower the indenter 391, which abuts on a position opposite to the groove D5 on the main surface 22 of the plate glass mother material 20. When the indenter 391 further lowers from this state, local stress is applied to the position opposite to the groove D5, to enlarge and cut the crack of the groove D5. With respect to the other grooves, the cutting is performed by the similar positioning and pressing operations, so that 100 materials to be pressed in total are finally formed. Additionally, here, examples of the local stress include, in addition to a stress attributed to pressure or heat locally applied from the outside, a stress by stress concentration of force or heat applied from the outside in the groove portion, and a stress generated by enlarging the local tensile stress (F1 shown in FIG. 3) generated beforehand in the tip end portion of the vertical crack during groove formation by the pressure or heat applied from the outside.

The formed material to be pressed is press molded in a heated/softened state to form a glass optical element. The glass optical elements, such as lenses and prisms, are manufactured by performing polishing and grinding after the press molding.

Additionally, the criterion of the quality of the material to be pressed is that no chipping is generated and the weight is uniform. For this, it is important to form preferable cracks in a scribing stage. In this case, vertical cracks as well as horizontal cracks are generated. To allow the vertical cracks to grow to perform precise cutting, it is important that the vertical cracks are deeper than the horizontal cracks. Above all, in the preferable crack, the tensile stress is produced by the pressing force of the wheel cutter 161, and in more preferable crack, the stress remains more strongly. When the tensile stress by which the crack tries to open itself is enlarged, the load for cutting can be reduced, which can prevent the glass from being chipped. Moreover, with a large tensile stress, cutting can be performed without generating any bending moment in the portion to be cut, or even if the bending moment is very small. Therefore, the displacement of the plate glass mother material 20 can be reduced. Consequently, the glass materials fail to interfere with one another, and after cutting, the generation of chipping and the damage on the surface can be prevented.

Furthermore, the crack vertical to the main surface is preferably deep. Particularly preferably, the crack is deeper than the horizontal crack which is one cause of the glass chipping. When the vertical crack is deep, the load to generate the local stress for cutting can be reduced. Additionally, when the vertical crack is deeper than the horizontal crack, the glass chipping can securely be prevented.

The preferable crack is obtained by setting the blade tip angle θ of the wheel cutter 161 and the pressing load during scribing to optimum values.

The method of setting the blade tip angle θ of the wheel cutter 161 and the pressing load during scribing in order to form the groove having the preferable crack will next be described.

First, to determine the blade tip angle θ of the wheel cutter 161, by using wheel cutters with various blade tip angles were used, and by changing the plate thickness of each of plate glass members of three types of materials, scribing and cutting were performed. Subsequently, the blade tip angle θ of the wheel cutter by which excellent materials to be pressed can be obtained was checked.

Figure 13:
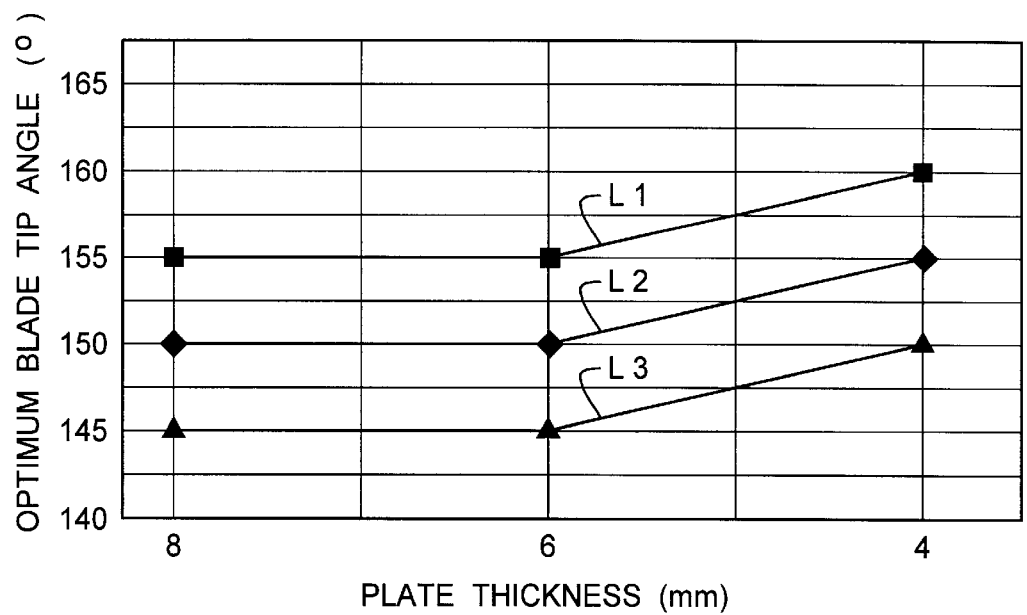
FIG. 13 is a graph showing wheel cutter optimum blade tip angles in various plate glass mother materials.

FIG. 13 is a graph showing optimum blade tip angles of the wheel cutter in various plate glass mother materials. Here, test was carried out by setting the pressing load of the wheel cutter 161 to be constant. Moreover, the cutting amount of the wheel cutter 161 to the glass surface and the speed of the wheel cutter 161 during scribing were set to be constant (e.g., 0.05 mm for the cutting amount, and 250 mm/sec for the scribing speed).

As the material of the plate glass mother material 20, three types of glasses were selected: borate-lantern type (characteristic L1); borosilicate type (characteristic L2); silica-lead type (characteristic L3). Moreover, with respect to each of the materials, the plate glass mother materials having plate thickness of 4 (mm), 6 (mm), and 8 (mm) were scribed and cut. The blade tip angle θ by which the optimum material to be pressed is obtained in this manner is shown in the drawing. Here, judgment criteria of the optimum material to be pressed is that the formed material to be pressed has a little weight dispersion, and that the rib mark depth (depth of the vertical crack) of the cut face is in the range of about 0.5 to 0.6 (mm).

As a result, it has been found that the optimum blade tip angle θ of the wheel cutter 161 can be represented by the following equation (1):

$$\theta = a - b \cdot \beta_1 + c \cdot \beta_2 \tag{1}$$

Here, $\beta_1$ is the plate thickness of the plate glass mother material 20, and $\beta_2$ is a parameter indicative of the material of the plate glass mother material 20. Moreover, a, b, c are positive coefficients. It is seen from the equation that the optimum blade tip angle θ is preferably reduced when the plate thickness of the plate glass mother material 20 is enlarged, and is preferably enlarged when the parameter indicative of the material of the plate glass mother material 20 is increased.

Here, as the parameter indicative of the material; an rigidity, hardness, wear degree, Young's modulus, and the like can be applied. When the rigidity is used as the parameter, the coefficient a is in the range of 100 to 200, the coefficient b is 1 to 2, and the coefficient c is 0.5 to 0.6. By setting them to these values, the vertical crack deeper than the horizontal crack can be formed, and in the vertical crack the tensile stress remains to such a degree that the glass can be cut without being chipped. Moreover, to enhance the effect, the coefficients a, b, c are preferably in the ranges of 141.01 to 142.99, 1.3 to 1.48, and 0.51 to 0.55, respectively.

Subsequently, to obtain the optimum pressing load of the wheel cutter 161, the similar test was carried out.

Figure 14:
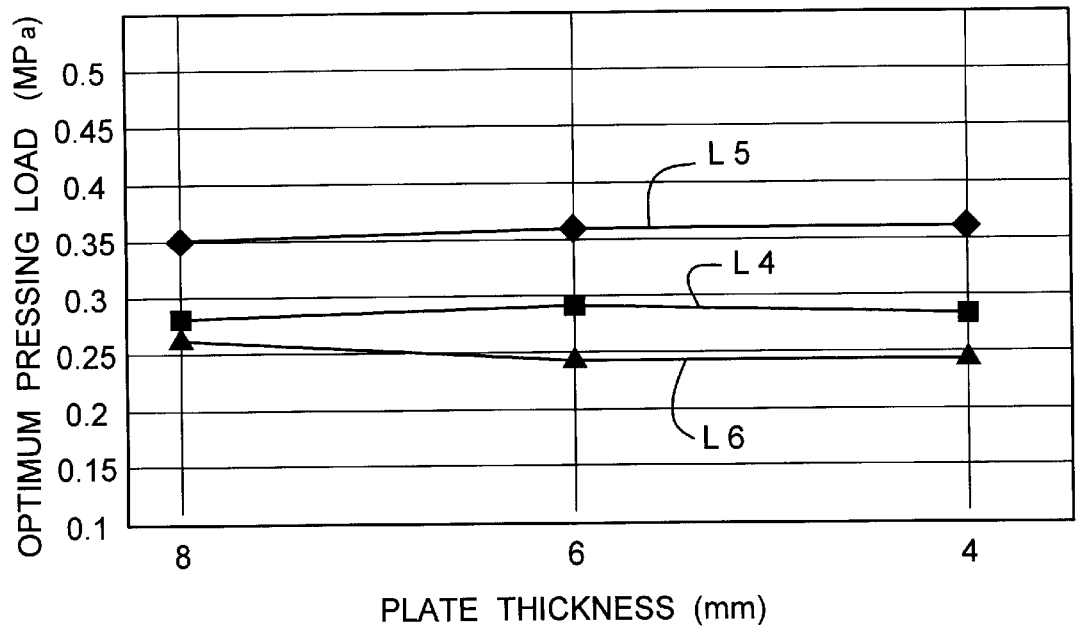
FIG. 14 is a graph showing wheel cutter optimum pressing loads in various plate glass mother materials.

FIG. 14 is a graph showing optimum pressing loads of the wheel cutter 161, various plate glass mother materials. Here, in the same manner as in the blade tip angle, the cutting amount of the wheel cutter 161 to the glass surface and the speed of the wheel cutter 161 during scribing were set to be constant (e.g., 0.05 mm for the cutting amount, and 250 mm/sec for the scribing speed).

Moreover, as the material of the plate glass mother material 20, three types of glasses were selected: borate-lantern type (characteristic L4); borosilicate type (characteristic L5); and silica-lead type (characteristic L6). Moreover, with respect to each of the materials, the plate glass mother materials having plate thickness of 4 (mm), 6 (mm), and 8 (mm) were scribed and cut. The pressing load by which the optimum material to be pressed is obtained in this manner is shown in the drawing. Moreover, in the same manner as in the blade tip angle, the judgment criteria of the optimum material to be pressed is that the formed material to be pressed has a little weight dispersion (specifically, ±5 wt %), and that the rib mark depth (depth of the vertical crack) of the cut face is in the range of about 0.5 to 0.6 (mm).

It can be seen from the results of FIG. 14 that the difference of plate thickness has little influence on the pressing load. Additionally, the rigidity (GPa)/specific gravity ($kg \cdot m^{-2}$) was selected as the parameter to determine the optimum pressing load, and the relation between the rigidity/specific gravity and the optimum pressing load was checked. This is shown in FIG. 15.

Figure 15:
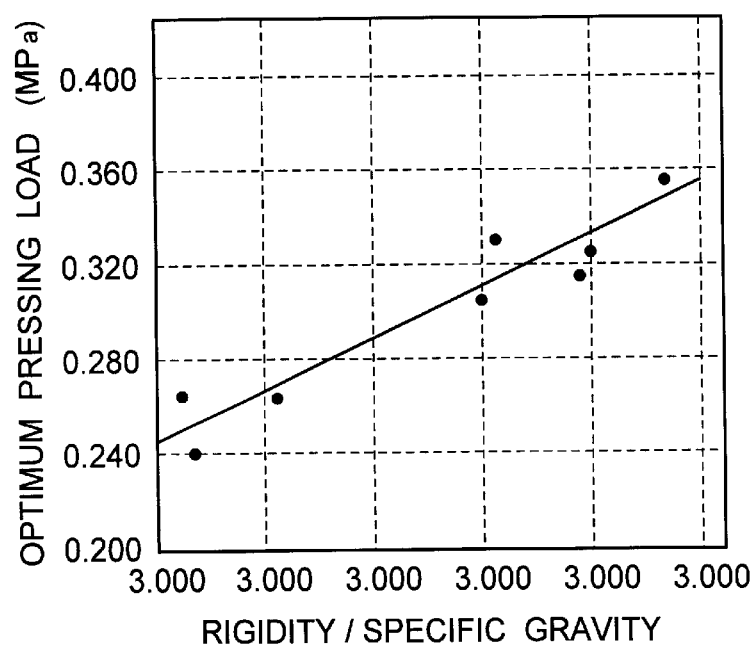
FIG. 15 is a graph showing a relation between rigidity and optimum pressing load.

Based on the results of FIG. 15, it has been found that optimum pressing load W of the wheel cutter 161 can be represented by the following equation (2):

$$W = d + e \cdot \alpha \tag{2}$$

Here, α denotes the parameter indicative of the material of the plate glass mother material 20/specific gravity. Moreover, d, e are positive coefficients. From the equation, it is seen that the optimum pressing load W is preferably reduced when the specific gravity of the plate glass mother material 20 is large, and is preferably enlarged when the parameter indicative of the material of the glass mother material 20 is large.

Here, as the parameter indicative of the material, the rigidity, hardness, wear degree, Young's modulus, and the like can be applied. When the rigidity is used as the parameter, the coefficients d, e are in the ranges of 0.15 to 0.3 and 0.001 to 0.03, respectively, preferably 0.171 to 0.246 and 0.006 to 0.014.

By determining the blade tip angle θ of the wheel cutter 161 and the pressing load W during scribing based on the equations (1) and (2) obtained as described above, and accordingly performing scribing with the scribing device 100, preferable vertical cracks can be formed. Thereby, high-quality materials to be pressed can be obtained at high rate and in large amounts.

Additionally, in the embodiment, the example in which the grooves are formed in the plate glass mother material 20 to obtain the materials to be pressed has been described, but the present invention can be applied to the formation of grooves for cutting during manufacture of glass substrates for flat displays such as a liquid crystal display.

Moreover, in the embodiment, the example in which the wheel cutter 161 is used as a tool for forming the grooves has been described, but a rectangular cutter, and the like may be used.

Another embodiment of the plate glass mother material cutting device for use in the present invention will next be described.

Figure 16:
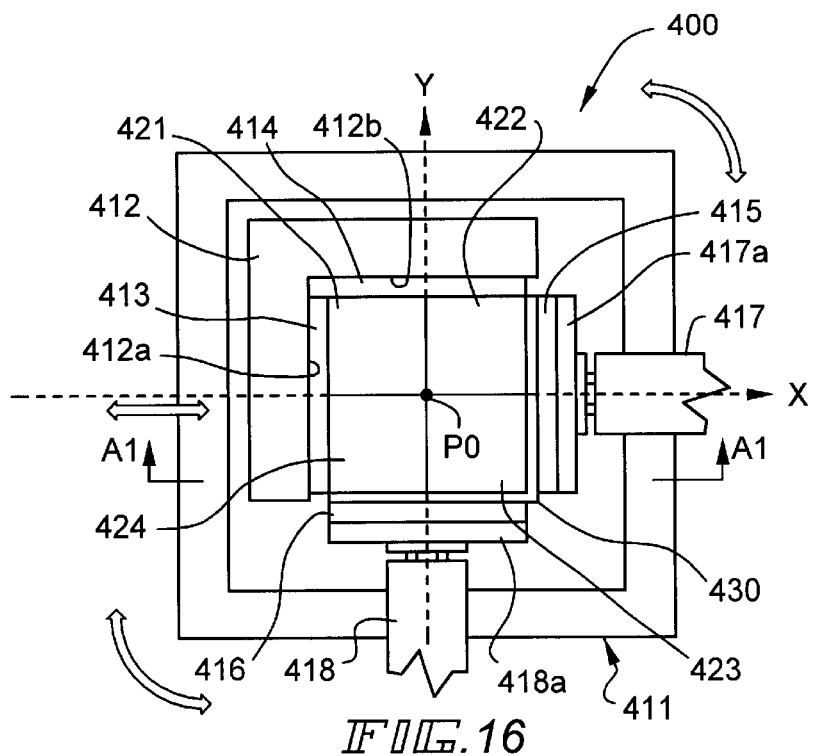
FIG. 16 is a plan view showing the constitution in the vicinity of the mounting base of the plate glass mother material cutting device according to the embodiment.
Figure 17:
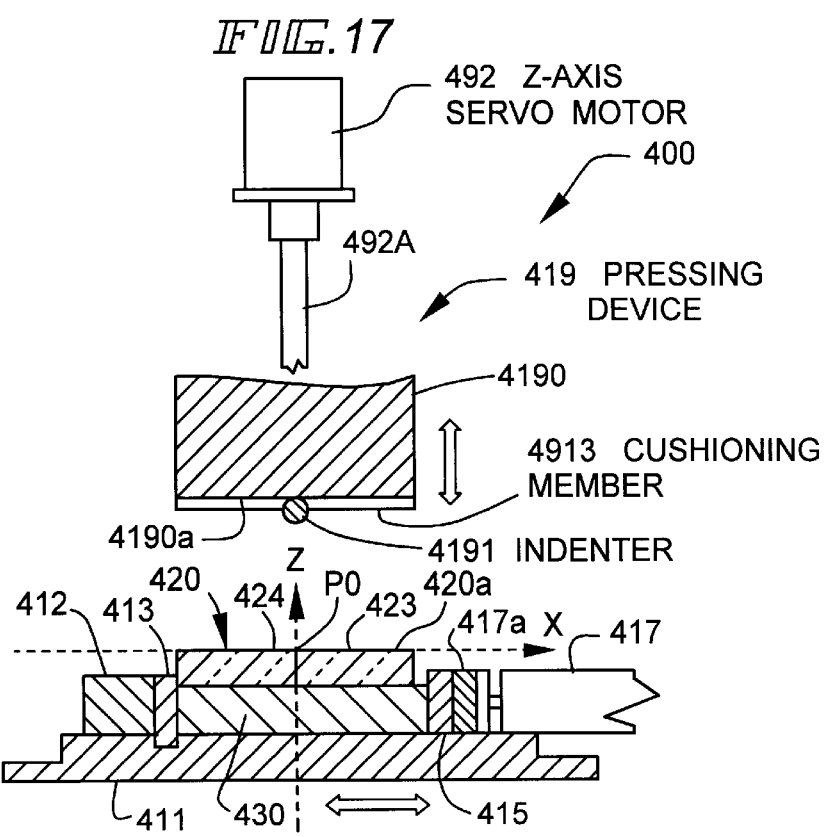
FIG. 17 is a sectional view taken along line A1—A1 of FIG. 16.

FIG. 16 is a plan view showing the constitution in the vicinity of the mounting base of a plate glass mother material cutting device 400 of the embodiment. Moreover, FIG. 17 is a sectional view taken along line A1—A1 of FIG.

16. The plate glass mother material cutting device 400 is provided with a mounting base 411 on which a plate glass mother material is laid. The mounting base 411 is disposed so that it can reciprocate in the X-axis direction of FIG. 16. Moreover, when the operation is started, the mounting base 411 is disposed so that a central point P0 coincides with the origin of X-Y coordinate system. Furthermore, the mounting base 411 is disposed so that it can rotate about the axis of the central point P0 in the X-Y plane. The movement and rotation of the mounting base 411 are executed by a drive mechanism section described later.

A reference plate 412 is fixed onto the mounting base 411. The reference plate 412 is an L-shaped member, and positioning members 413, 414 are fixed to inner side surfaces 412a, 412b. The positioning members 413, 414 are formed of materials lower in Young's modulus than a glass substrate, for example, elastic materials such as natural rubber, so that chipping, and the like are prevented from occurring when the plate glass mother material is cut.

Moreover, an auxiliary cutting member 430 having a substantially square plate shape is laid on the mounting base 411. The auxiliary cutting member 430 is pressed against the positioning members 413, 414 of the reference plate 412 by pressing devices 417 and 418. A positioning member 415 formed of natural rubber is fixed to a pressing plate 417a of the pressing device 417. The pressing device 417 presses the auxiliary cutting member 430 via the positioning member 415 in the X-axis direction toward the positioning member 413 of the reference plate 412.

Similarly, a positioning member 416 formed of natural rubber is fixed to a pressing plate 418a of the pressing device 418. The pressing device 418 pushes the auxiliary cutting member 430 via the positioning member 416 in the Y-axis direction toward the positioning member 414 of the reference plate 412. In this manner, the auxiliary cutting member 430 is positioned/fixed onto the mounting base 411.

On the auxiliary cutting member 430, a material to be cut 420 constituted of four plate glass mother materials 421 to 424 is laid in a smaller range than that of the auxiliary cutting member 430. The plate glass mother materials 421 to 424 are square plate members having substantially the same size, closely abut on one another, and are laid to closely abut on the side of the positioning members 413, 414. For the material to be cut 420, as shown in FIG. 17, an upper main surface 420 a is protruded from the upper side surfaces of the positioning members 413 to 416 by a constant amount. The main surface 420 a of the material to 10 be cut 420 is set to the reference position of a pressing stroke.

Moreover, since the plane size of the material to be cut 420 is smaller than the auxiliary cutting member 430, an appropriate gap is formed between the plate glass mother materials 423, 424 and the positioning members 415, 416. The gap secures an escape space for glass during cutting.

In the mounting base 411, member dimensions are designed so that when the material to be cut 420 is laid, the center of the material coincides with the central point P0 of the mounting base 411.

As shown in FIG. 17, a pressing device 419 is disposed above the mounting base 411.

An indenter base 4190 of the pressing device 419 is connected to the shaft of a Z-axis servo motor 4192 via a ball screw 4192a. The indenter base 4190 vertically moves along Z-axis by rotation of the Z-axis servo motor 4192. A round bar indenter 4191 extending in the Y-axis direction is fixed to an under surface 4190a of the indenter base 4190. The indenter 4191 presses from above and cuts the plate glass mother materials 421 to 424 of the material to be cut 420 as described later, and is formed in a stretched shape to have substantially the same length as that of the groove described later.

Figure 18:
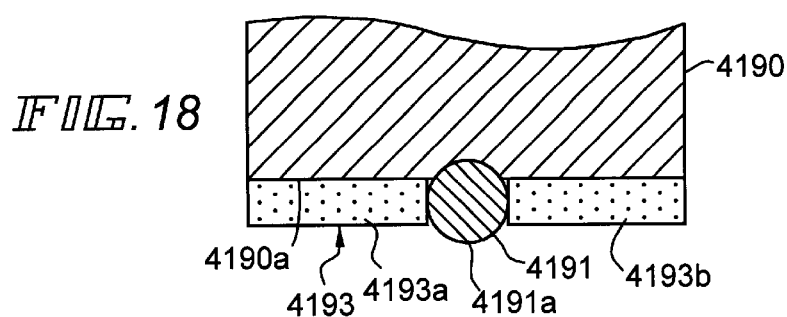
FIG. 18 is a view showing the attaching structure of a cushioning member.

Moreover, a cushioning member 4193 is attached to the under surface 4190a of the indenter base 4190. As the cushioning member 4193, as shown in FIG. 18, two cushioning members 4193a, 4193b are used, which are substantially entirely placed onto the under surface 4190a excluding the indenter 4191. In the cushioning member 4193a or 4193b, a material for use has a hardness to such a degree that the cut pieces of the material to be cut 420 fail to rise up, and has an appropriate softness not to damage the cut pieces. Moreover, the cushioning member 4193a or 4193b for use has a thickness to such a degree that it fails to be protruded downward from a lowermost portion 4191 a of the indenter 4191.

As the member meeting these conditions, a polishing sheet for lens polishing is exemplified. Specifically, it is a resin member having a porous layer, and, for example, the member for use has a total thickness in the range of 0.70 mm to 1.5 mm, a porous layer thickness of 400 $\mu$m to 450 $\mu$m, a pore diameter of 50 $\mu$m to 90 $\mu$m, a hardness of 50 degrees to 80 degrees, a compression modulus of 4% to 8%, and a compression modulus of elasticity of 60% to 80%. More preferably, the total thickness is 0.70 mm, the porous layer thickness is 400 $\mu$m, the pore diameter is in the range of 60 to 80 $\mu$m, the hardness is 70 degrees, the compression modulus is 6%, and the compression modulus of elasticity is about 72%.

Figure 19:
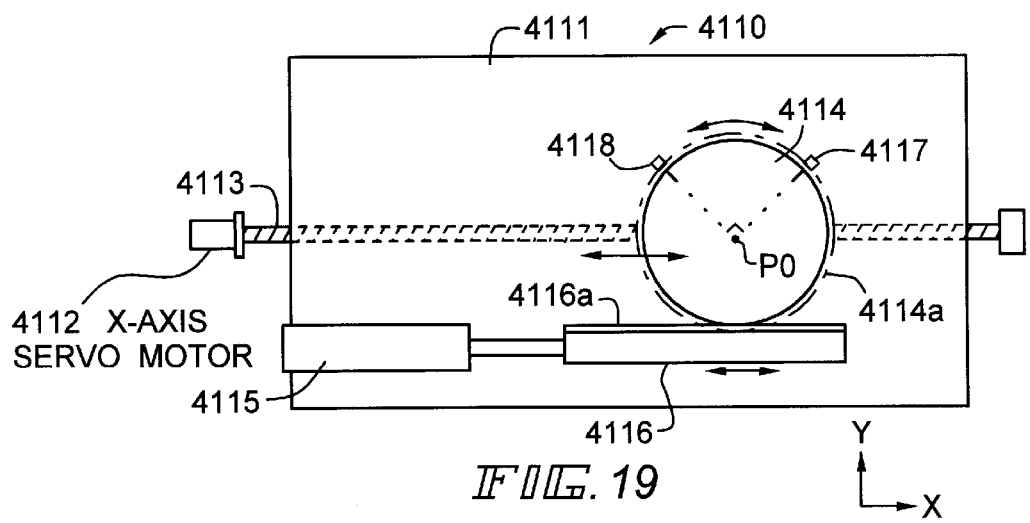
FIG. 19 is a view showing the constitution of the drive mechanism section of the mounting base.

FIG. 19 is a view showing the constitution of the drive mechanism section of the mounting base 411. Here, a plan view is shown in which the mounting base 411 in FIG. 16 is detached. An X-axis servo motor 4112 is fixed to a drive mechanism section 4110. A ball screw 4113 is attached to the shaft of the X-axis servo motor 4112.

The mounting base 411 is engaged with the ball screw 4113, and moves in the X-axis direction with rotation of the ball screw 411. On the other hand, a support board 4114 can rotate about a point overlapping the central point P0 of the mounting base 411. Moreover, a pinion portion 4114a is formed in the peripheral portion of the support board 4114. The pinion portion 4114a is engaged with a rack portion 4116a of a rack member 4116. The rack member 4116 is connected to a cylinder 4115, and moves in the X-axis direction with drive of the cylinder 4115.

In the drive mechanism section 4110, when the mounting base 411 is moved, the X-axis servo motor 4112 operates to move the mounting base 411. Moreover, the cylinder 4115 drives/rotates the support board 4114. Additionally, the rotation of the support board 4114 is controlled by mechanical stoppers 4117, 4118, so that it can rotate only in the range of 90°.

The concrete constitution of the material to be cut 420 will next be described.

Figure 20:
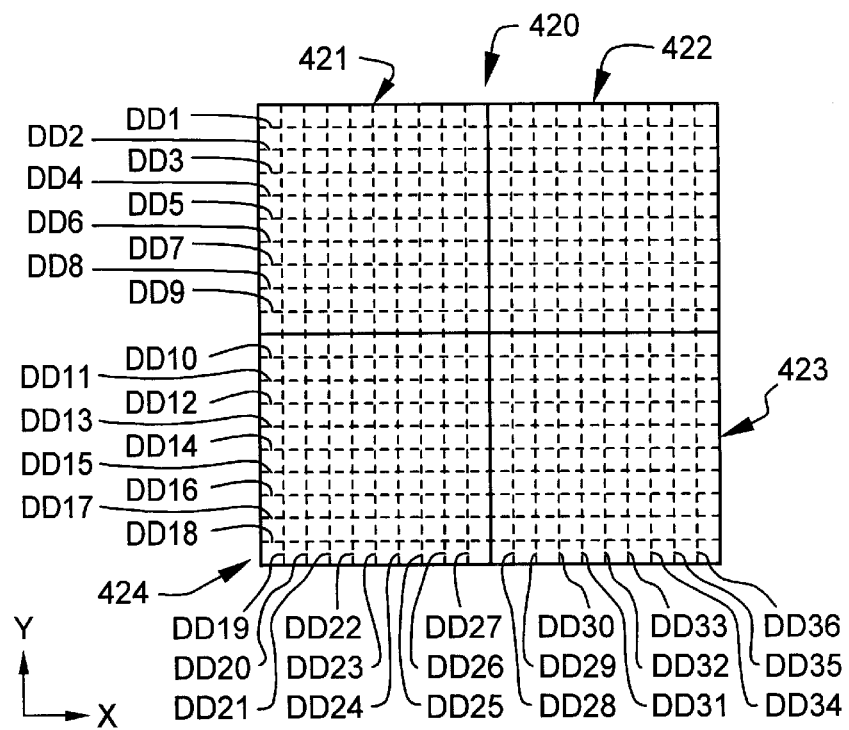
FIG. 20 is a plan view showing the constitution of a material to be cut.
Figure 21:
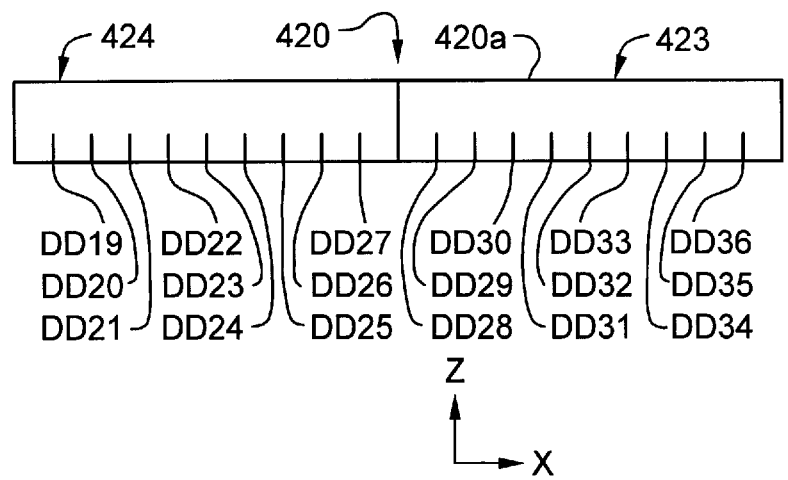
FIG. 21 is a front view of FIG. 20.

FIG. 20 is a plan view showing the constitution of the material to be cut 420. Moreover, FIG. 21 is a front view of FIG. 20. Four plate glass mother materials 421 to 424 constituting the material to be cut 420 are all plate glasses whose plane shapes are square. In a lower main surface 420b of the plate glass mother materials 421 to 424, 18 longitudinal and transverse grooves, that is, 36 grooves DD1 to DD36 in total are formed in lattices, and in V-shaped sectional forms. The plate glass mother materials 421 to 424 are thereby partitioned, so that each material has 10×10=100 blocks.

The grooves DD1 to DD36 are arranged in the same arrangement as when the material is laid on the plate glass mother material cutting device 400, and installed and formed in an exclusive scribing device in a reversed state (with the main surface 420b turned upward). Moreover, in this case, the grooves DD1 to DD36 are formed so that cracks are generated substantially in the vertical direction to the main surface 420b.

The material to be cut 420 constituted as described above is laid on the auxiliary cutting member 430 as shown in FIGS. 16, 17, and cut in order from the groove in the position where a large bending moment is received during pressing. For example, the groove DD14 in common with the plate glass mother materials 423 and 424 and disposed in the center between the materials is first cut. Subsequently, the groove DD5 in common with the plate glass mother materials 421, 422 and disposed in the center between the materials is cut. Furthermore, the grooves DD23, DD32, DD34, DD30, and the other grooves are cut in order.

The concrete constitution of the auxiliary cutting member 430 will next be described.

Figure 22:
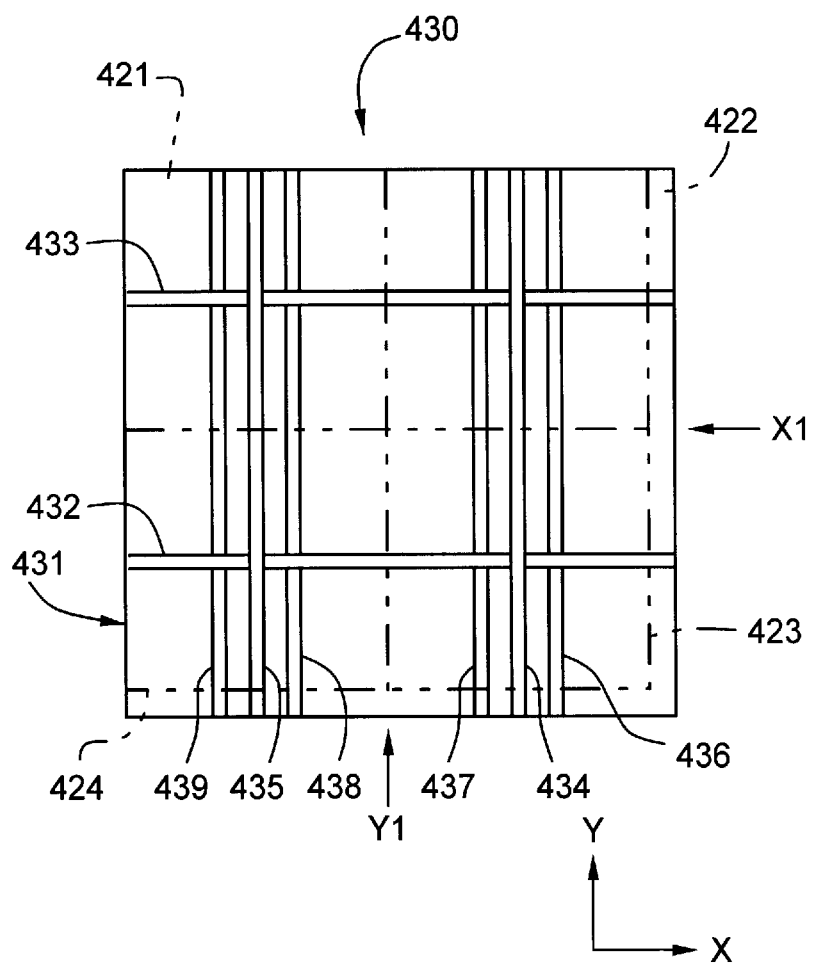
FIG. 22 is a plan view showing the constitution of the auxiliary cutting member.
Figure 23A:
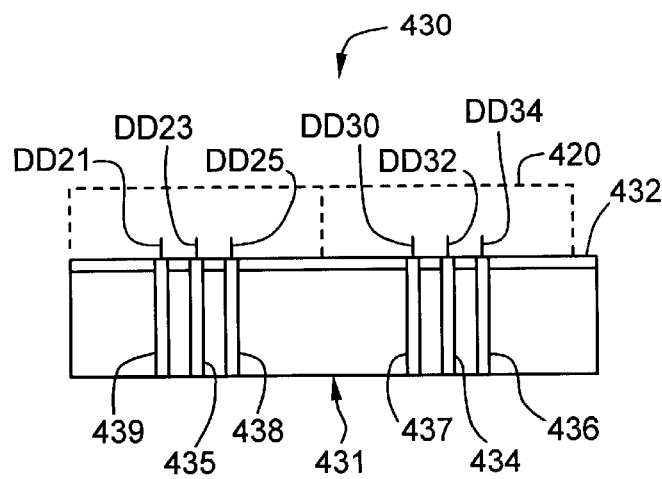
FIG. 23A is a side view as seen from an arrow direction X1 of FIG. 22.
Figure 23B:
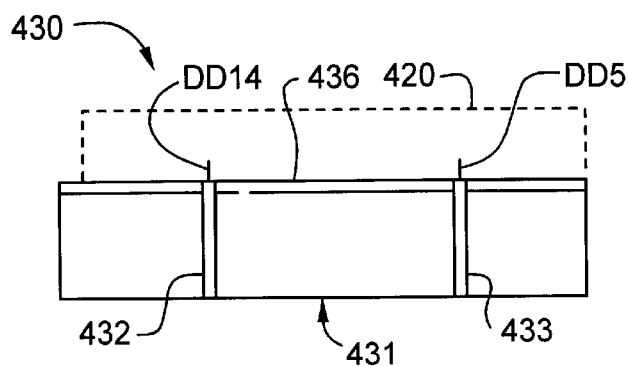
FIG. 23B is a side view as seen from an arrow direction Y1 of FIG. 22.

FIG. 22 is a plan view showing the constitution of the auxiliary cutting member 430. Moreover, FIG. 23 shows side views of the auxiliary cutting member 430: FIG. 23A is a side view as seen from an arrow direction X1 of FIG. 22; and FIG. 23B is a side view as seen from an arrow direction Y1 of FIG. 22. As described above, the longitudinal and transverse lengths of the auxiliary cutting member 430 are formed to be slightly longer than those of the material to be cut 420. The auxiliary cutting member 430 is constituted of a base block 431, and abutment members 432 to 439 arranged in the base block 431, and these are integrally formed.

The base block 431 is formed of urethane rubber. On the other hand, the abutment members 432 to 439 are formed of natural rubber, so that they have a thickness of about 5 mm. Moreover, as shown in FIG. 23, the abutment members 432 to 439 are formed so that they substantially coincide with one another in the heights of top surfaces, and they are slightly protruded from the top surface of the base block 431. The protruded amount and material of each abutment member are selected in accordance with the pressure during the cutting of the material to be cut 420.

As shown in FIG. 16, and the like, the four plate glass mother materials 421 to 424 are laid as the material to be cut 420 on the auxiliary cutting member 430. In this case, as shown in FIG. 23, they are laid so that the groove DD14 is positioned on the abutment member 432, the groove DD5 is positioned on the abutment member 433, the groove DD32 is positioned on the abutment member 434, and the groove DD23 is positioned on the abutment member 435.

The operation of the plate glass mother material cutting device 400 of the embodiment will next be described.

First, before starting the cutting operation, as shown in FIGS. 16, 17, the central point PO of the mounting base 411 is positioned in the origin of the X-Y coordinate. On the other hand, the pressing device 419 is in a position sufficiently higher than the mounting base 411 as shown in FIG. 17. In this case, the position and direction of the mounting base 411 are controlled so that the groove DD14 to be first cut of the material to be cut 420 extends along the Y-axis, that is, the groove is directed to overlap the indenter 4191 of the pressing device 419 on the X-Y plane.

When positioning is completed, the Z-axis servo motor 4192 operates to lower the indenter 4191, which abuts on a position opposite to the groove DD14 on the main surface 421 of the plate glass mother material 420. When the indenter 4191 further lowers from this state to perform pressing, the crack of the groove DD14 is enlarged, and cut.

The pressing stroke amount of the indenter 4191 is determined for each groove, and the cutting operation stops at the time when movement is performed by the determined pressing strokes.

When the cutting of the groove DD14 is completed, the indenter base 4190 is retreated upward, the mounting base 411 subsequently slides in the X-axis direction, and positioning is performed so that the groove DD5 coincides with the Y-axis. In the same manner as the groove DD14, the groove DD5 is pressurized by the indenter 4191, and cut. Subsequently, the mounting base 411 rotates by 90°, positioning is performed to align, for example, the groove DD23 with the Y-axis, and cutting is performed. Thereafter, by the same procedure, the remaining grooves are cut in the determined order. By cutting all the grooves, 400 materials to be pressed in total are formed.

Figure 24:
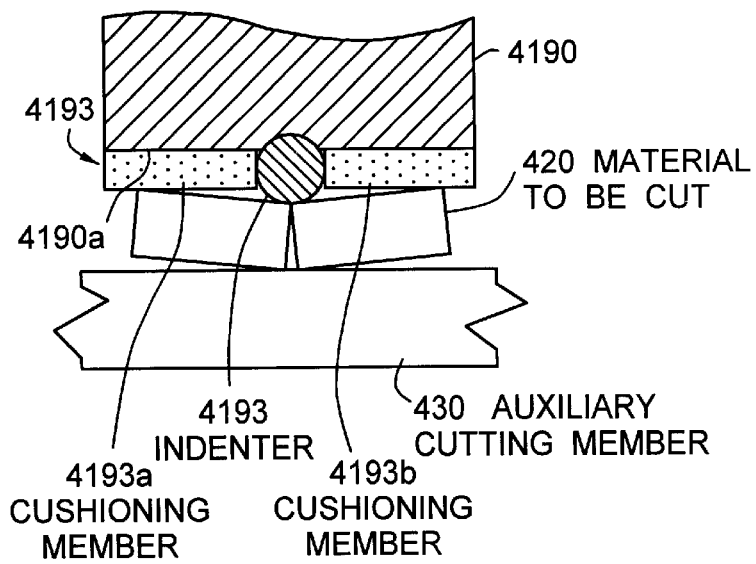
FIG. 24 is a side view showing a state immediate after the material to be cut is cut by an indenter.

FIG. 24 is a side view showing a state immediately after the material to be cut 420 is cut by the indenter 4191. After the indenter 4191 cuts the material to be cut 420, the cut pieces of the material to be cut 420 try to rise up. In the device of the embodiment, however, since the cushioning members 4193a, 4193b are attached around the indenter 4191, these cushioning members 4193a, 4193b appropriately press the cut pieces to prevent them from rising. Therefore, the corner portions of adjacent cut pieces can be prevented from colliding against each other and being chipped. Therefore, the materials to be pressed uniform in weight can be formed. Moreover, the cut pieces can also be prevented from jumping to the outside. Therefore, during the operation, no unnecessary interruption is made, which enhances the efficiency. Therefore, since the cut pieces are held by the cushioning members 4193a, 4193b, the surfaces of the cut pieces are prevented from being scratched.

Moreover, in the embodiment, since four plate glass mother materials 421 to 424 are simultaneously set and cut, operation time is shortened as compared with when the four materials are separately cut. Four plate glass mother materials 421 to 424 with 50 cm square are actually divided into 400. As a result, 400 cut pieces little in weight dispersion can be formed in the half of the time required for the method of cutting each material separately.

In the method, however, the number of cut pieces is increased in the latter half of the operation, and the cut pieces easily interfere with one another. In the embodiment, however, since the rising is prevented by the cushioning members 4193a, 4193b, the interference of the cut pieces can be prevented. Additionally, the generation of chips can be prevented. Therefore, high-quality materials to be pressed can be provided at high rate.

Furthermore, in the embodiment, when the grooves are formed in four plate glass mother materials 421 to 424, the four materials are mounted on the scribing device with the same arrangement as during cutting, and are simultaneously scribed. Therefore, even when there are shape errors in the plate glass mother materials 421 to 424, the positions and directions of the grooves fail to deviate among the plate glass mother materials in the case where the materials are mounted on the plate glass mother material cutting device 400. Therefore, since the direction of the indenter 4191 constantly coincides with the direction of each groove, accurate cutting can be performed. Also in this meaning, the high-quality materials to be pressed can be provided at high rate.

What is claimed is:

1. A method of cutting a plate glass mother material, comprising the steps of:

preparing the plate glass mother material in which a plurality of grooves are scribed on one main surface;

disposing said plate glass mother material with said grooves turned inward; and pressing an outer surface of said plate glass mother material with a cushioning member having a thickness not to be protruded downward from a lowermost portion of an indenter, said cushioning member being attached onto an under surface of an indenter base excluding said indenter, pressing a portion opposite to a groove on said outer surface with said indenter having a stretched shape, and cutting said plate glass mother material.

2. The method of manufacturing of claim 1, further comprising the steps of:

after said step of pressing, obtaining a glass material;

heating and softening the glass material; and subsequently performing press molding.

3. The method according to claim 1, wherein when a glass member to be cut contacts an adjacent cut glass member, the cut glass member is inhibited from being inclined in a thickness direction of the glass member by a cutting reaction force, so that the glass members are prevented from being broken.

4. The method of manufacturing of claim 3, further comprising the steps of:

after said step of pressing, obtaining a glass material;

heating and softening the glass material; and subsequently performing press molding.

5. The method according to claim 1, wherein said plurality of grooves are scribed on one main surface while said plurality of grooves are aligned along a straight line, and said grooves are simultaneously pressed and cut along the same straight line out of said grooves of said plate glass mother materials by said pressing indenter.

6. The method of manufacturing of claim 5, further comprising the steps of:

after said step of pressing, obtaining a glass material;

heating and softening the glass material; and subsequently performing press molding.

7. The method according to claim 5, wherein said plate glass mother material comprises a plurality of pieces and wherein said plurality of pieces of plate glass mother material are maintained in one position during said cutting to form said grooves.

8. The method of manufacturing of claim 7, further comprising the steps of:

after said step of pressing, obtaining a glass material;

heating and softening the glass material; and subsequently performing press molding.

* * * * *